US007216166B2

(12) United States Patent
Sugauchi et al.

(10) Patent No.: US 7,216,166 B2
(45) Date of Patent: May 8, 2007

(54) NETWORK MANAGEMENT APPARATUS AND NETWORK MANAGEMENT METHOD

(75) Inventors: Kiminori Sugauchi, Yokohama (JP); Minoru Koizumi, Yokohama (JP); Michio Yamazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 950 days.

(21) Appl. No.: 10/378,851

(22) Filed: Mar. 5, 2003

(65) Prior Publication Data

US 2004/0059811 A1 Mar. 25, 2004

(30) Foreign Application Priority Data

Sep. 20, 2002 (JP) ............................. 2002-275970

(51) Int. Cl.
*G06F 15/173* (2006.01)
(52) U.S. Cl. ...................... 709/224; 709/223; 709/220; 715/736
(58) Field of Classification Search ................ 709/224, 709/223, 220, 238, 245; 715/736
See application file for complete search history.

(56) References Cited

U.S. PATENT DOCUMENTS

| | | | | |
|---|---|---|---|---|
| 5,961,596 A | * | 10/1999 | Takubo et al. .............. | 709/224 |
| 6,040,834 A | * | 3/2000 | Jain et al. .................... | 709/223 |
| 6,041,349 A | | 3/2000 | Sugauchi et al. | |
| 6,049,827 A | | 4/2000 | Sugauchi et al. | |
| 6,339,789 B1 | | 1/2002 | Sugauchi et al. | |
| 6,505,246 B1 | * | 1/2003 | Land et al. ................. | 709/224 |
| 6,535,227 B1 | * | 3/2003 | Fox et al. ................... | 709/224 |
| 6,944,674 B2 | * | 9/2005 | Frelechoux et al. ........ | 709/238 |
| 6,982,960 B2 | * | 1/2006 | Lee et al. ................... | 370/254 |
| 7,003,559 B1 | * | 2/2006 | Natarajan et al. ........... | 709/223 |
| 2002/0055996 A1 | | 5/2002 | Sugauchi et al. | |
| 2002/0083371 A1 | * | 6/2002 | Ramanathan et al. ......... | 714/37 |
| 2003/0041142 A1 | * | 2/2003 | Zhang et al. ................ | 709/224 |

FOREIGN PATENT DOCUMENTS

JP 05-323867 12/1993

OTHER PUBLICATIONS

Ogane, Hisao, "TCP/IP and OSI Network Management", Soft Research Center, 1993, pp. 334-339, 482.

* cited by examiner

*Primary Examiner*—Philip B. Tran
(74) *Attorney, Agent, or Firm*—Mattingly, Stanger, Malur & Brundidge, P.C.

(57) ABSTRACT

The present invention provides a technique suitable for configuration management of a network for which the number of logical network layers can be set. A network management apparatus 10 receives an address definition information file defining logical hierarchical structure of an IPv6 network 20, from an operator through a definition information reception unit 103. A configuration analysis unit 104 generates management tables defining hierarchical relationships of logical networks, based on the address definition information file and IP addresses collected respectively by an information collection unit 102 from network elements belonging to the IPv6 network 20, and registers the management tables into a management DB unit 101.

7 Claims, 20 Drawing Sheets

NETWORK MANAGEMENT APPARATUS

IPv6 NETWORK

NETWORK MANAGEMENT APPARATUS

NETWORK ELEMENT

ELEMENT INFORMATION COLLECTION PROCESS

DEFINITION INFORMATION REGISTRATION PROCESS

FIG.7

ADDRESS DEFINITION INFORMATION FILE

Kind=Address Length ~502
Policy=Group Base; ~503
Network Position=23 /63; ~504
Hierarchy=5; ~505
0/15;
16/23;
24/31;  }—506
32/39;

MANAGEMENT INFORMATION REGISTRATION PROCESS

FIG.9

MANAGEMENT TABLE

| NETWORK IDENTIFIER | | HIERARCHICAL LEVEL | | 603 |
|---|---|---|---|---|
| LOGICAL NETWORK ADDRESS | | | | 604 |
| INCLUDED NETWORK IDENTIFIER | | | | 605 |
| INCLUDED RELAY NODE IDENTIFIER | | | | 607 |
| EXTERNAL RELAY NODE IDENTIFIER | | | | 608 |
| ADDITIONAL INFORMATION | | | | 609 |

MANAGEMENT TABLES OF 4TH LAYER

| NETWORK IDENTIFIER | N1 | HIERARCHICAL LEVEL | 4TH LAYER |
|---|---|---|---|
| LOGICAL NETWORK ADDRESS | | AAAA | |
| INCLUDED NETWORK IDENTIFIER | | N20, N21 | |
| INCLUDED RELAY NODE IDENTIFIER | | R10 | |
| EXTERNAL RELAY NODE IDENTIFIER | | R10:R1 | |

| NETWORK IDENTIFIER | N2 | HIERARCHICAL LEVEL | 4TH LAYER |
|---|---|---|---|
| LOGICAL NETWORK ADDRESS | | AAAB | |
| INCLUDED NETWORK IDENTIFIER | | N22, N22' | |
| INCLUDED RELAY NODE IDENTIFIER | | R11 | |
| EXTERNAL RELAY NODE IDENTIFIER | | R11:R1 | |

| NETWORK IDENTIFIER | N3 | HIERARCHICAL LEVEL | 4TH LAYER |
|---|---|---|---|
| LOGICAL NETWORK ADDRESS | | AABA | |
| INCLUDED NETWORK IDENTIFIER | | N23 | |
| INCLUDED RELAY NODE IDENTIFIER | | R2 | |
| EXTERNAL RELAY NODE IDENTIFIER | | R2:R3, R12 | |

| NETWORK IDENTIFIER | N4 | HIERARCHICAL LEVEL | 4TH LAYER |
|---|---|---|---|
| LOGICAL NETWORK ADDRESS | | AABB | |
| INCLUDED NETWORK IDENTIFIER | | N24, N25 | |
| INCLUDED RELAY NODE IDENTIFIER | | R12 | |
| EXTERNAL RELAY NODE IDENTIFIER | | R12:R2 | |

| NETWORK IDENTIFIER | N5 | HIERARCHICAL LEVEL | 4TH LAYER |
|---|---|---|---|
| LOGICAL NETWORK ADDRESS | | ABAA | |
| INCLUDED NETWORK IDENTIFIER | | N26 | |
| INCLUDED RELAY NODE IDENTIFIER | | R4 | |
| EXTERNAL RELAY NODE IDENTIFIER | | R4:R6 | |

| NETWORK IDENTIFIER | N6 | HIERARCHICAL LEVEL | 4TH LAYER |
|---|---|---|---|
| LOGICAL NETWORK ADDRESS | | ABAB | |
| INCLUDED NETWORK IDENTIFIER | | N27 | |
| INCLUDED RELAY NODE IDENTIFIER | | R4 | |
| EXTERNAL RELAY NODE IDENTIFIER | | R4:R6 | |

| NETWORK IDENTIFIER | N7 | HIERARCHICAL LEVEL | 4TH LAYER |
|---|---|---|---|
| LOGICAL NETWORK ADDRESS | | ABBA | |
| INCLUDED NETWORK IDENTIFIER | | N29, N28 | |
| INCLUDED RELAY NODE IDENTIFIER | | R13 | |
| EXTERNAL RELAY NODE IDENTIFIER | | R13:R5 | |

| NETWORK IDENTIFIER | N8 | HIERARCHICAL LEVEL | 4TH LAYER |
|---|---|---|---|
| LOGICAL NETWORK ADDRESS | | ABBB | |
| INCLUDED NETWORK IDENTIFIER | | N30, N31 | |
| INCLUDED RELAY NODE IDENTIFIER | | R14 | |
| EXTERNAL RELAY NODE IDENTIFIER | | R14:R5 | |

| NETWORK IDENTIFIER | N9 | HIERARCHICAL LEVEL | 4TH LAYER |
|---|---|---|---|
| LOGICAL NETWORK ADDRESS | | ACAA | |
| INCLUDED NETWORK IDENTIFIER | | N32 | |
| INCLUDED RELAY NODE IDENTIFIER | | R8 | |
| EXTERNAL RELAY NODE IDENTIFIER | | R8:R7 | |

| NETWORK IDENTIFIER | N10 | HIERARCHICAL LEVEL | 4TH LAYER |
|---|---|---|---|
| LOGICAL NETWORK ADDRESS | | ACAB | |
| INCLUDED NETWORK IDENTIFIER | | N33 | |
| INCLUDED RELAY NODE IDENTIFIER | | R8 | |
| EXTERNAL RELAY NODE IDENTIFIER | | R8:R7 | |

FIG.14A MANAGEMENT TABLES OF 3RD LAYER

| NETWORK IDENTIFIER | N14 | HIERARCHICAL LEVEL | 3TH LAYER |
|---|---|---|---|
| LOGICAL NETWORK ADDRESS | AAA | | |
| INCLUDED NETWORK IDENTIFIER | N1, N2 | | |
| INCLUDED RELAY NODE IDENTIFIER | R1, R10, R11 | | |
| EXTERNAL RELAY NODE IDENTIFIER | R1:R3 | | |

| NETWORK IDENTIFIER | N15 | HIERARCHICAL LEVEL | 3TH LAYER |
|---|---|---|---|
| LOGICAL NETWORK ADDRESS | AAB | | |
| INCLUDED NETWORK IDENTIFIER | N3, N4 | | |
| INCLUDED RELAY NODE IDENTIFIER | R2, R12 | | |
| EXTERNAL RELAY NODE IDENTIFIER | R2:R3 | | |

| NETWORK IDENTIFIER | N16 | HIERARCHICAL LEVEL | 3TH LAYER |
|---|---|---|---|
| LOGICAL NETWORK ADDRESS | ABA | | |
| INCLUDED NETWORK IDENTIFIER | N5, N6 | | |
| INCLUDED RELAY NODE IDENTIFIER | R4 | | |
| EXTERNAL RELAY NODE IDENTIFIER | R4:R6 | | |

| NETWORK IDENTIFIER | N17 | HIERARCHICAL LEVEL | 3TH LAYER |
|---|---|---|---|
| LOGICAL NETWORK ADDRESS | ABB | | |
| INCLUDED NETWORK IDENTIFIER | N7, N8 | | |
| INCLUDED RELAY NODE IDENTIFIER | R5, R13, R14 | | |
| EXTERNAL RELAY NODE IDENTIFIER | R5:R7 | | |

| NETWORK IDENTIFIER | N18 | HIERARCHICAL LEVEL | 3TH LAYER |
|---|---|---|---|
| LOGICAL NETWORK ADDRESS | ACA | | |
| INCLUDED NETWORK IDENTIFIER | N9, N10 | | |
| INCLUDED RELAY NODE IDENTIFIER | R8 | | |
| EXTERNAL RELAY NODE IDENTIFIER | R8:R7 | | |

FIG.14B MANAGEMENT TABLES OF 2ND LAYER

| NETWORK IDENTIFIER | N11 | HIERARCHICAL LEVEL | 2TH LAYER |
|---|---|---|---|
| LOGICAL NETWORK ADDRESS | AA | | |
| INCLUDED NETWORK IDENTIFIER | N14, N15 | | |
| INCLUDED RELAY NODE IDENTIFIER | R1, R2, R3 | | |
| EXTERNAL RELAY NODE IDENTIFIER | R3:R6, R7 | | |

| NETWORK IDENTIFIER | N12 | HIERARCHICAL LEVEL | 2TH LAYER |
|---|---|---|---|
| LOGICAL NETWORK ADDRESS | AB | | |
| INCLUDED NETWORK IDENTIFIER | N16, N17 | | |
| INCLUDED RELAY NODE IDENTIFIER | R4, R5, R6, R7 | | |
| EXTERNAL RELAY NODE IDENTIFIER | R6:R7, R3 / R7:R6, R3, R8 | | |

| NETWORK IDENTIFIER | N13 | HIERARCHICAL LEVEL | 2TH LAYER |
|---|---|---|---|
| LOGICAL NETWORK ADDRESS | AC | | |
| INCLUDED NETWORK IDENTIFIER | N18 | | |
| INCLUDED RELAY NODE IDENTIFIER | R8 | | |
| EXTERNAL RELAY NODE IDENTIFIER | R8:R7 | | |

FIG.14C MANAGEMENT TABLE OF 1ST LAYER

| NETWORK IDENTIFIER | N19 | HIERARCHICAL LEVEL | 1TH LAYER |
|---|---|---|---|
| LOGICAL NETWORK ADDRESS | A | | |
| INCLUDED NETWORK IDENTIFIER | N11, N12, N13 | | |
| INCLUDED RELAY NODE IDENTIFIER | R3, R6, R7, R8 | | |
| EXTERNAL RELAY NODE IDENTIFIER | | | |

FIG.16

MAP GENERATION INFORMATION TABLE

| MAP IDENTIFIER | | NETWORK IDENTIFIER | |
|---|---|---|---|
| UPPER MAP IDENTIFIER | | | |
| SYMBOL INFORMATION | | | |
| CONNECTING LINE INFORMATION | | | |

NETWORK MANAGEMENT APPARATUS AND NETWORK MANAGEMENT METHOD

BACKGROUND OF THE INVENTION

The present invention relates to a technique of generating a network monitoring screen.

For management of a configuration of an IPv4 (Internet Protocol Version 4) network, a technique for hierarchical representing the network based on IP addresses assigned to network elements.

For example, OOGANE, Hisao, TCP/IP and OSI Network Management, pp. 334–339 (issued by Soft Research Center Inc.) discloses a technique for hierarchical representing a configuration of an IPv4 network, by using: a route submap that represents an IPv4 network as one symbol; an Internet submap that represents each of sub-networks constituting the IPv4 network as one symbol and represents each node for connecting between sub-networks as a router (a gateway); a network submap that represents segments in sub-networks and segment connection apparatuses having IP addresses, such as a bridge, HUB and repeater; and a segment submap that represents end user nodes included in a segment.

SUMMARY OF THE INVENTION

An IPv4 network uses an IP address of 32 bits length consisting of a network address and a node address. A network address has predetermined ranges that can be used by four classes respectively.

By contrast, as shown in FIG. 23, an IPv6 (Internet Protocol Version 6) network as a next generation IP network uses an IP address 901 of 128 bits length consisting of a subnet prefix 902 of n bits and an interface ID 903 of 128-n bits. The subnet prefix 902 consists of a public topology 904 of 48 bits length fixed by ISP (Internet Service Provider) and a site topology 905 of n-48 bits length assigned by ISP. A part of a site topology 905 can be freely set within a logical network to which that part is assigned.

When the submaps described in the above document are used for configuration management of an IPv6 network having thus-described features, the following problems occur.

In an IPv6 network, a large number of IP addresses can be assigned. Accordingly, the number of logical networks constituting the IPv6 network becomes larger, and also, the number of network elements of each logical network of the IPv6 network becomes larger. Thus, the numbers of symbols and nodes that each submap may represent become larger, and it is difficult for a user to find a target symbol or node. In other words, it is inconvenient to use submaps.

Further, in an IPv6 network, a part of a site topology 905 can be freely set within a logical network to which that part is assigned, as described above. Accordingly, the number of logical network layers can be changed according to the set contents of the site topology 905. On the other hand, in the case of the network configuration management using the submaps described in the above document, the types of the submaps used for hierarchical representing of a network are fixed (four types, namely, a route submap, an Internet submap, a network submap, and segment submap). In other words, the number of logical layers is fixed. Thus, in some cases, the above-mentioned submaps can not be used for hierarchical representing conforming to actual hierarchical structure of an IPv6 network for which the number of layers of logical networks can be freely set. In other words, actual hierarchical structure of logical networks does not correspond to submaps.

Further, in the network configuration management using the submaps described in the above document, it is impossible to distinguish locations of network elements that belong to the same logical network from the viewpoint of hierarchical structure of an IP address.

The present invention provides a technique suitable for configuration management of a network which the number of logical network layers can be set flexibly.

The present invention further provides a technique that can distinguish locations of network elements belonging to the same network from the viewpoint of logical layers.

To solve those problems, a network management apparatus in the present invention performs the following process.

Namely, the network management apparatus collects addresses assigned respectively to network elements from the network elements belonging to a managed network. Further, address definition information that defines logical hierarchical structure of the managed network is acquired from an operator. Then, the collected address of the network elements are classified into logical networks for each logical layer of the managed network specified by the address definition information, so as to define hierarchical relationships between the logical networks. Further, for each logical network, information of a network monitoring screen that represents a network configuration in the layer just under the logical network in question is generated, according to the above-defined hierarchical relationships of the logical network in question.

According to the present invention, address definition information that defines logical hierarchical structure of a managed network, can be received from an operator. And, hierarchical relationships of the logical networks are defined based on the address definition information received from the operator and the collected addresses respectively from the network elements belonging to the managed network. Thus, for respect to a network which the number of logical layers can be changed, the configuration of that network can be hierarchical displayed by network monitoring screens whose number depends on the number of the logical layers of that network.

Favorably, according to each element information including an address, connection relationships and type of a network element collected from each network element belonging to the managed network, relay nodes (routers, bridges, HUBs, repeaters, and the like) included in each logical network classified by the address definition information and connecting relationships between those relay nodes may be defined. In that case, for each logical network, using symbols representing logical networks (referred to as lower-side logical networks) in one layer lower than the logical network in question included in the logical network in question, symbols representing relay nodes included in the logical network in question, and symbols representing connection between the lower-side logical networks and the relay nodes, information of a network monitoring screen representing the network configuration may be generated.

Here, when it is possible that at least two lower-side logical networks included in a logical network are positioned at different locations, the logical network in question may be divided separately according to the each location, and hierarchical relationships respectively may be defined. By this, the same logical network can be displayed separately, according to difference in location.

Judgment on whether there is possibility that lower-side logical networks are positioned at different locations can be made by examining whether relay nodes connected respectively to those lower-side logical networks are defined as a relay node connected to the logical network including those lower-side logical networks.

BRIEF DESCRIPTION OF THE DRAWINGS

FIG. 7 is a diagram showing an example of registration contents of an address definition information file;

FIG. 9 is a diagram showing an example of a configuration of a management table;

FIG. 13 is a diagram showing respective management tables of the logical networks in the 4th layer (the lowest layer) generated by the network management apparatus 10 in the case of the network configuration example shown in FIG. 12;

FIGS. 14A, 14B and 14C are a diagram showing respective management tables of the logical networks in the 3rd–1st layers generated by the network management apparatus 10 in the case of the network configuration example shown in FIG. 12;

FIG. 16 is a diagram showing an example of a map generation information table;

DETAILED DESCRIPTION OF THE PREFERRED EMBODIMENTS

The embodiments of the present invention will be described below.

Figure 1:
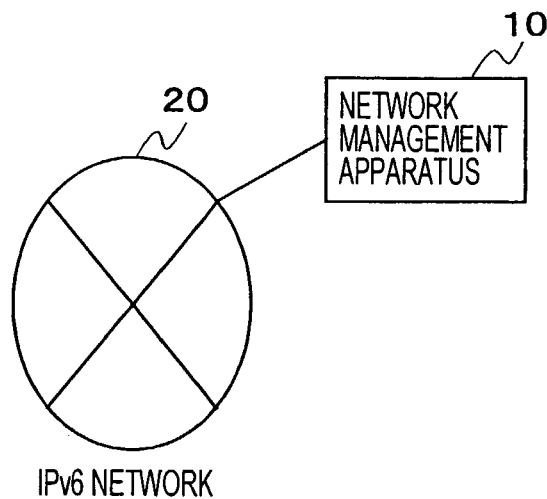
FIG. 1 is a schematic diagram showing a network system to which a network management apparatus as an embodiment of the present invention is applied.

FIG. 1 is a schematic diagram showing a network system to which a network management apparatus of the embodiment of the present invention is applied. As shown in the figure, the network management apparatus 10 of the present embodiment is used being connected with an IPv6 network 20 as a managed network.

Here, the network management apparatus 10 may be connected to the IPv6 network 20 as a network terminal of the IPv6 network 20. Or, the network management apparatus 10 may be connected to each constituent network element of the IPv6 network 20, through a dedicated network (a management network). Here, a "network element" is a network terminal or a relay apparatus for connecting a network terminal to the network, such as a router, a bridge, a HUB, or a repeater.

Figure 2:
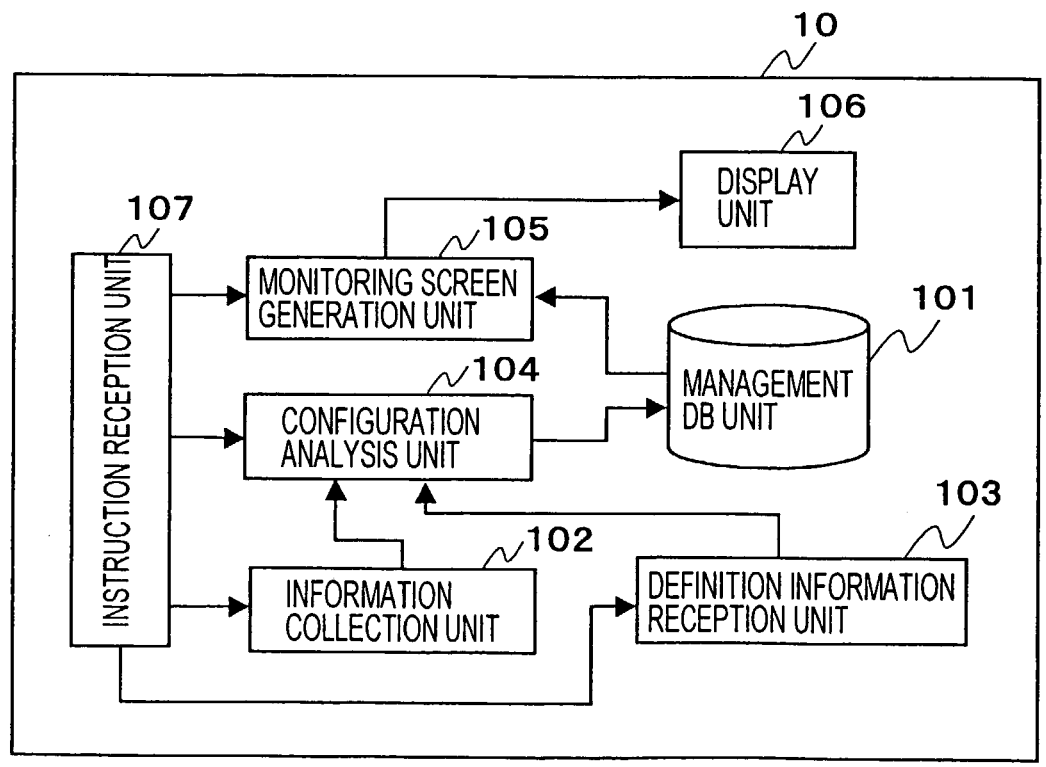
FIG. 2 is a schematic block diagram showing the network management apparatus 10 shown in FIG. 1.

FIG. 2 shows schematically a configuration of the network management apparatus 10.

As shown in the figure, the network management apparatus 10 comprises: a management DB (database) unit 101 for registering management information of each constituent logical network of the IPv6 network 20; an information collection unit 102 for collecting element information from each network element of the IPv6 network 20 and for holding the element information, said element information including an identifier, an element type, an IP address of the element, and IP addresses of elements connected to the element in question; a definition information reception unit 103 for receiving and holding address definition information that defines logical hierarchical structure of the IPv6 network 20, which can be specified by an IP address; a configuration analysis unit 104 for analyzing the logical hierarchical structure of the IPv6 network 20 to generate management information including a configuration and hierarchical relationship of each logical network; a monitoring screen generation unit 105 for generating a network monitoring screen representing a configuration of the logical network based on management information of the logical network, for each logical network; a display unit 106 for displaying a network monitoring screen; and an instruction reception unit 107 for receiving an instruction from an operator.

Here, the definition information reception unit 103 may be for reading and holding address definition information from a storage medium such as a flexible disk or a CD-ROM, or from a communication network such as Internet or a communication medium as a carrier wave on the communication network. Or, the definition information reception unit 103 may be for generating and holding address definition information according to an operator's instruction received through the instruction reception unit 107.

Figure 3:
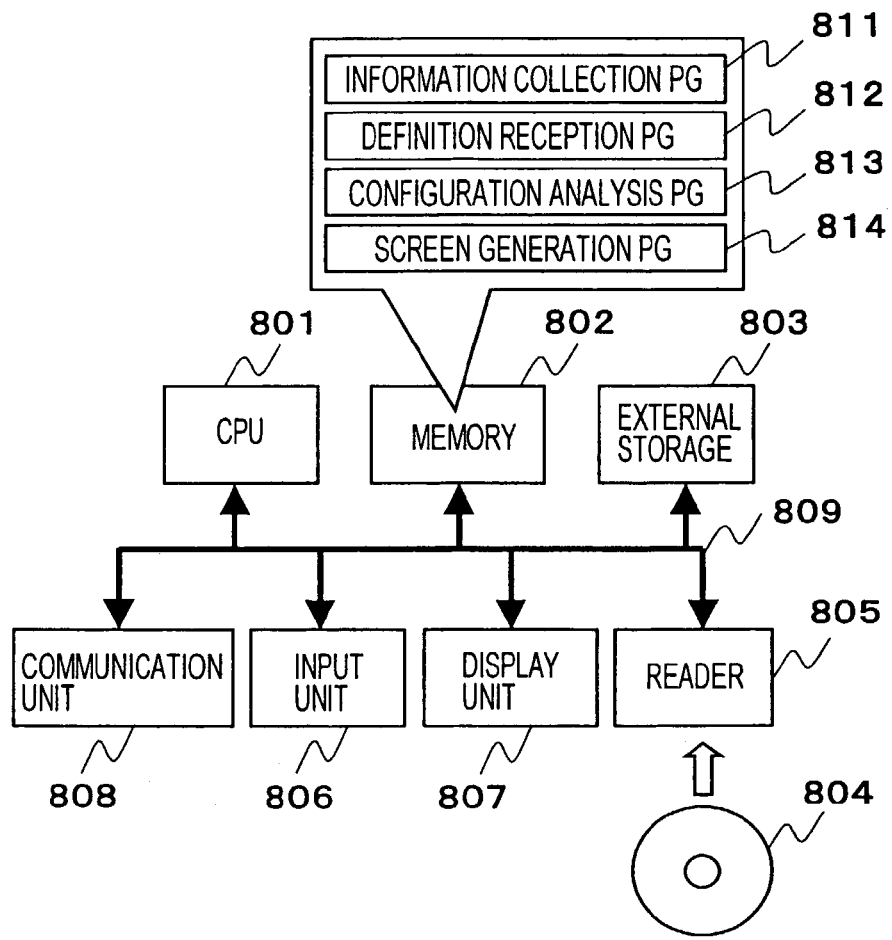
FIG. 3 is a diagram showing an example of a hardware configuration of the network management apparatus 10 shown in FIG. 2.

For example, as shown in FIG. 3, the network management apparatus 10 having the configuration described above may be implemented in an ordinary computer system comprising a CPU 801, a memory 802, an external storage 803 such as a HDD, a reader 805 for reading information from a portable storage medium 804 such as a CD-ROM or DVD-ROM, an input unit 806 such as a keyboard and/or mouse, a display unit 807 such as a CRT or LCD, and a communication unit 808 for communicating with each network element of the IPv6 network 20, with the CPU 801 executing certain programs 811–814 loaded onto the memory 802.

These programs 811–814 may be loaded directly onto the memory 802 from a storage medium 804 through the reader 805, from a communication network such as Internet through the communication unit 808. Or, these programs 811–814 may be downloaded onto the external storage 809 once, and then, loaded onto the memory 802.

The information collection PG 811 is a program for realizing the information collection unit 102. The definition reception PG 812 is a program for realizing the definition information reception unit 103. The configuration analysis PG 813 is a program for realizing the configuration analysis unit 104. The screen generation PG 814 is a program for realizing the monitoring screen generation unit 105. These programs 811–814 may be provided together as so-called packaged software, or may be provided separately.

Figure 4:
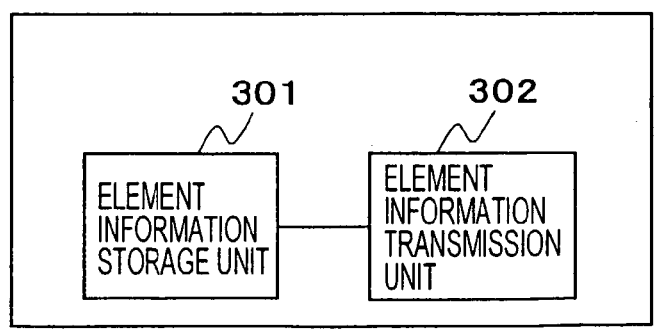
FIG. 4 is a schematic block diagram showing a network element as each constituent of the IPv6 network 20 shown in FIG. 1.

As described above, each constituent network element of the IPv6 network 20 is a network terminal or a relay apparatus such as a router, a bridge, a HUB, or a repeater, for connecting a network terminal to the IPv6 network 20. However, in addition to proper functions of a network element, a network element of the present embodiment is provided with an element information storage unit 301 and an element information transmission unit 302, as shown in FIG. 4. The element information storage unit 301 stores element information including the identifier, element type and IP address of the network element itself and IP addresses of network elements connected to this network element. And the element information transmission unit 302 communicates with the network management apparatus 10 to send element information stored in the element information storage unit 301 to the network management apparatus 10.

Next, operation of the network management apparatus 10 will be described.

First, will be described process of collecting element information of each network element.

Figure 5:
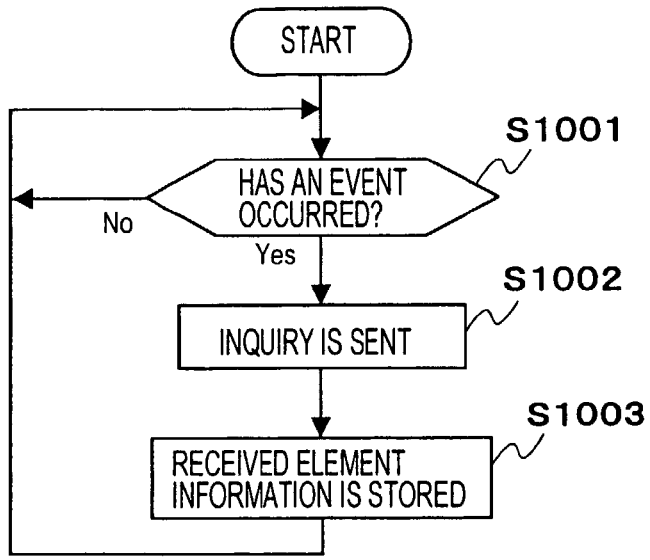
FIG. 5 is a flowchart for explaining element information collecting process by the network management apparatus 10.

FIG. 5 is a flowchart for explaining element information collecting process of the network management apparatus 10.

In the network management apparatus 10, when there occurs a predetermined event such as reception of an instruction from the operator or coming of a predetermined time (S1001), then the information collection unit 102 inquires element information including an IP address from each network element, using SNMP (Simple Network Management Protocol) or the like (S1002). In each constituent network element of the IPv6 network 20, when this inquiry is received, the element information transmission unit 302 reads the element information stored in the element information storage unit 301, and sends to the network management apparatus 10.

In the network management apparatus 10, when the element information is received from each constituent network element of the IPv6 network 20, the information collection unit 102 keeps the received element information (S1003).

Hereinabove, there has been described the case where the element information transmission unit 302 of each network element sends the element information, in response to an inquiry by the information collection unit 102 of the network management apparatus 10. Instead of or in addition to this, it is possible that, at the time of power-on, the element information transmission unit 302 of each network element reads the element information stored in the element information storage unit 301, and sends to the network management apparatus 10. The information collection unit 102 of the network management apparatus 10 receives and keeps the element information.

Next, address definition information registration process will be described.

Figure 6:
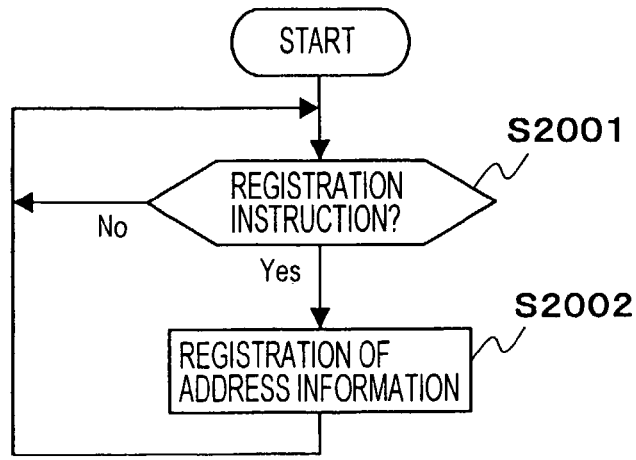
FIG. 6 is a flowchart for explaining address definition information registration process by the network management apparatus 10.

FIG. 6 is a flowchart for explaining address definition information registration process of the network management apparatus 10.

In the network management apparatus 10, when the definition information reception unit 103 receives an address definition information registration instruction from the operator through the instruction reception unit 107 or the like (S2001), according to that instruction, a storage location of the address definition information is accessed to read and register an address definition information file. Or, the definition information reception unit 103 receives an address definition information file from an operator through the instruction reception unit 108, and registers (S2002).

FIG. 7 shows an example of registration contents of an address definition information file. As described above, an address definition information file defines hierarchical structure of an IP address, namely, logical hierarchical structure of the IPv6 network 20.

In FIG. 7, the reference numeral 502 is an entry that describes a value of "kind" indicating a type of the definition information file, and "Address Length" mans that this file is described in the entry 502.

The reference numeral 503 is an entry that describes "Policy" indicating a network monitoring screen generation policy, and it has either "Group Base" or "Location Base" is described in the entry 503. Here, "Group Base" means a logical network is represented by one symbol, and "Location Base" means the same logical networks are represented by different symbols for different geographic locations.

The reference numeral 504 refers to an entry that describes "Network Position" indicating a description position of logical hierarchical network information. In this example, the figure shows that logical hierarchical network information is described in the 24th–64th bits from the top of the IP address.

The reference numeral 505 refers to an entry that describes "Hierarchy" indicating the number of logical layers of the IPv6 network 20 indicated by the network information. In this example, the number of the logical layers of the IPv6 network 20 is set to "5".

The reference numeral 506 refers to an entry that describes a description position of each logical layer information of the network defined in the entry 505. In this example, layer information of the first layer is described in the 1st–16th bits of the network information, whose description position is defined in the entry 504. Layer information of the second layer just under the first layer is described in the next 17th–24th bits. Layer information of the third layer just under the second layer is described in the next 25th–32nd bits. And, Layer information of the fourth layer under the third layer described in the next 33rd–40th bits. Further, layer information of the fifth layer that is under the fourth layer is represented by a subnet prefix of an IP address.

Next, management information registration process for each logical network will be described.

Figure 8:
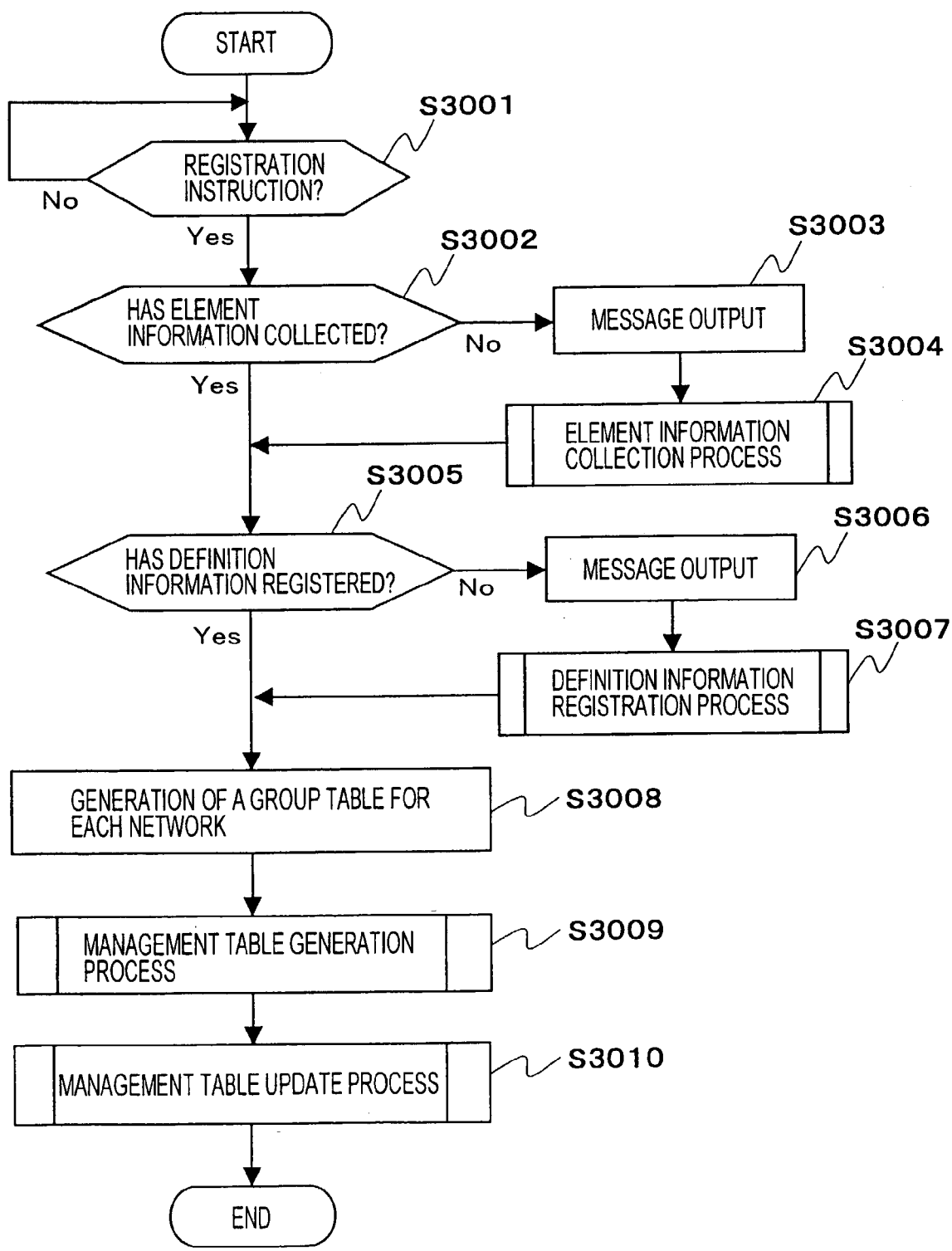
FIG. 8 is a flowchart for explaining management information registration process by the network management apparatus 10.

FIG. 8 is a flowchart for explaining management information registration process by the network management apparatus 10.

First, in the network management apparatus 10, when the configuration analysis unit 104 receives a registration instruction of management information of a logical network from the operator through the instruction reception unit 107 or the like (S3001), the configuration analysis unit 104 confirms if the information collection unit 102 has collected element information of each constituent network element of the IPv6 network 20 (S3002). If not, the configuration analysis unit 104 informs the operator to that effect, for example, by displaying a message on the display unit 106 (S3003). Then, the configuration analysis unit 104 executes the information collection unit 103 to perform the element information collection process shown in FIG. 5 by generating an event for the element information collection (S3004).

Next, the configuration analysis unit 104 confirms if the definition information reception unit 103 has registered an address definition information file (S3005). If not, the configuration analysis unit 104 informs the operator to that effect, for example, by displaying a message on the display unit 106 (S3006). Then, the configuration analysis unit 104 executes the definition information reception unit 103 to perform the definition information collection process shown in FIG. 6 (S3007).

When the element information of each network element and the address definition information file are confirmed to be taken by the network management apparatus 10, as described above, the configuration analysis unit 104 generates a group table for each network based on the IP addresses included in the element information of all the network elements (S3008). Here, a group table is a set of network elements having the same network address, and a unique identifier is given to each group table. Based on this table, a map (the bottom layer map) which is a set of nodes is generated. A relay apparatus having the network address of a group table is included in that group table.

Next, the configuration analysis unit 104 performs a process of generating a management table (a management table generating process) for registering management information of a logical network, for each logical network obtained by logically hierarchizing the IPv6 network 20 according to the address definition information file (S3009). Then, the configuration analysis unit 104 performs a process (a management table update process) of registering information (including hierarchical relationships and connection relationships of the logical networks) required for generating a network monitoring screen in each management table generated (S3010).

FIG. 9 shows an example of a configuration of a management table. As described above, a management table is used for registering management information of a logical network.

In FIG. 9, an entry 602 registers a network identifier (for example, a nickname) for identifying an object logical network (hereinafter, referred to as an object network).

An entry 603 registers a hierarchical level in the logical hierarchy indicated by the address definition information file.

An entry 604 registers an address (a partial address corresponding to the hierarchical level registered in the entry 603) of the object network.

An entry 605 registers network identifiers of logical networks (hereinafter, referred to as an included networks) that are included in the object network and are in the layer just under the hierarchical level registered in the entry 603.

An entry 607 registers identifiers (for example, nicknames) of relay apparatuses (hereinafter, referred to as included relay nodes) included in the object network.

An entry 608 registers an identifier of an included relay node (hereinafter, referred to as an external relay node) having a connection relationship with a element except with its own network, among the included relay nodes. The identifier of the external relay node is registered together with an identifier of the network element connected to that external relay node.

And, an entry 609 registers additional information as supplementary information for generating a network monitoring screen.

Figure 10:
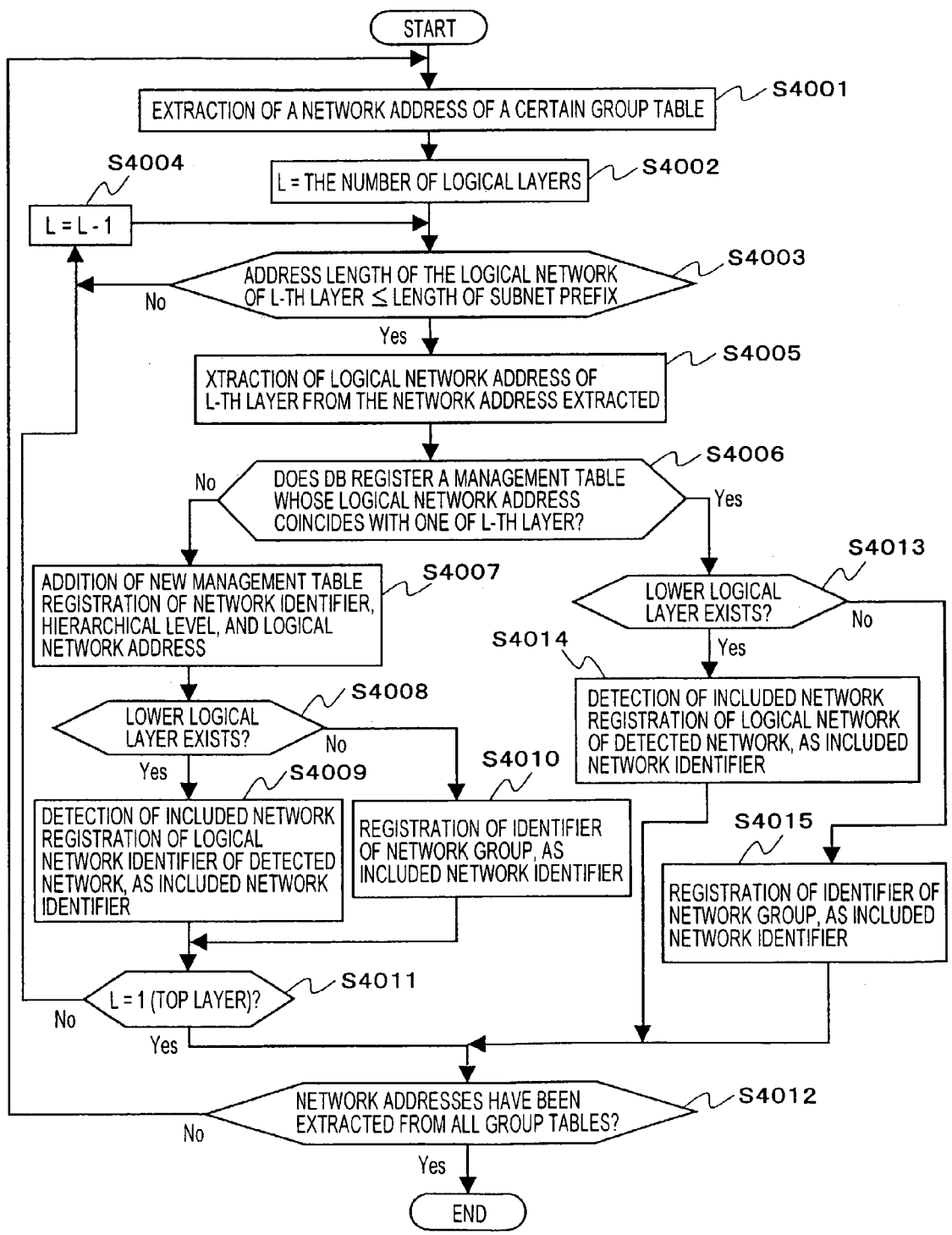
FIG. 10 is a flowchart for explaining S3009 (a management table generating process) in FIG. 8.

FIG. 10 is a flowchart for explaining S3009 (the management table generation process) of FIG. 8.

First, the configuration analysis unit 104 reads one of the group tables generated in the S3008 of FIG. 8, and extracts the network address of that group table (S4001).

Next, the configuration analysis unit 104 sets a variable L to the number of the logical layers, registered in the entry 505 of the address definition information file (thus, L indicating the bottom layer) (S4002), and confirms that the address length of the logical network of the L-th layer specified from the description contents of the entries 504 and 505 of the address definition information file is shorter than the length of the subnet prefix of the extracted network address (hereinafter, referred to as a remarked network address) (S4003). This is because the length of the subnet prefix is arbitrary within the range of 128 bits length as described above, and accordingly, it is possible to exists a network address having logical hierarchical structure only down to a layer that is upper than the L-th layer.

When the address length of the logical network of the L-th layer is longer than the length of the subnet prefix of the remarked network address, the configuration analysis unit 104 decrements the variable L by one (S4004), and returns to S4003. On the other hand, when the address length in question is shorter than the length of the subnet prefix, the configuration analysis unit 104 extracts the logical network address of the L-th layer from the remarked network address, according to the description contents of the entries 504 and 505 of the address definition information file (S4005).

Next, the configuration analysis unit 104 examines whether the management DB unit 101 registers the management table whose entry 603 registers the hierarchical level coinciding with the variable L, and whose entry 604 registers the logical network address (hereinafter, referred to as a remarked logical network address) of the extracted L-th layer (S4006).

In S4006, when the management DB unit 101 does not register the management table whose entry 603 registers the hierarchical level coinciding with the variable L and whose entry 604 registers the remarked logical network address, the configuration analysis unit 104 adds a management table anew to the management DB unit 101. Then, the configuration analysis unit 104 registers a newly-generated network identifier to the entry 602 of the added management table, the variable L as the hierarchical level to the entry 603, and the remarked network address to the entry 604 (S4007).

Next, the configuration analysis unit 104 examines whether there exists a lower logical layer (the (L+1)-th layer) under the layer indicated by the variable L (S4008). This can be confirmed by examining whether the variable L is smaller than the number of the logical layers registered in the entry 505 of the address definition information file.

In S4008, when the lower logical layer (the (L+1)-th layer) exists, the configuration analysis unit 104 detects such a management table that its entry 603 registers the hierarchical level (L+1) and the remarked logical network address is included in the logical network addresses registered in its entry 604. Then, the network identifier registered in the entry 602 of the detected management table is registered as an included network identifier into the entry 605 of the management table newly-added in S4007 (S4009).

On the other hand, in S4008, when the lower logical layer (the (L+1)-th layer) does not exist, the identifier (the identifier of the network group) given to the group table read in S4001 is registered as an included network identifier into the entry 605 of the management table newly-added in S4007 (S4010).

Then, the configuration analysis unit 104 examines whether the variable L indicates "1", i.e., the top layer (S4011). When the variable L indicates the top layer, the flow proceeds to S4012. On the other hand, when the variable L does not indicate the top layer, the flow returns to S4004 to repeat it.

On the other hand, when, in S4006, the management DB unit 101 registers the management table whose entry 603 registers the hierarchical level coinciding with the variable L, and whose entry 604 registers the remarked logical network address, the configuration analysis unit 104 examines whether there exists a logical layer (the (L+1)-th layer) under the layer indicated by the variable L (S4013).

In S4013, when the lower logical layer (the (L+1)th layer) exists, the configuration analysis unit 104 detects such a management table that its entry 603 registers the hierarchical level (L+1) and the remarked logical network address is included in the logical network addresses registered in its entry 604. The network identifier registered in the entry 602 of the detected management table is registered as an included network identifier into the entry 605 of the management table detected from the management DB unit 101 in S4006 (S4014). Then, the flow proceeds to S4012.

On the other hand, in S4013, when the lower logical layer (the (L+1)th layer) does not exist, the identifier (the identifier of the network group) given to the group table read in S4001 is registered as an included network identifier into the entry 605 of the management table detected from the management DB unit 101 in S4006 (S4015). Then, the flow proceeds to S4012.

In S4012, the configuration analysis unit 104 judges if the network addresses of all the group tables have been read. If not, the flow returns to S4001 to repeat the process On the other hand, if the network addresses have been read from all the group tables, this flow is ended.

According to the above-described process, a management table of each logical network at each logical layer specified by the address definition file is generated.

Figure 11:
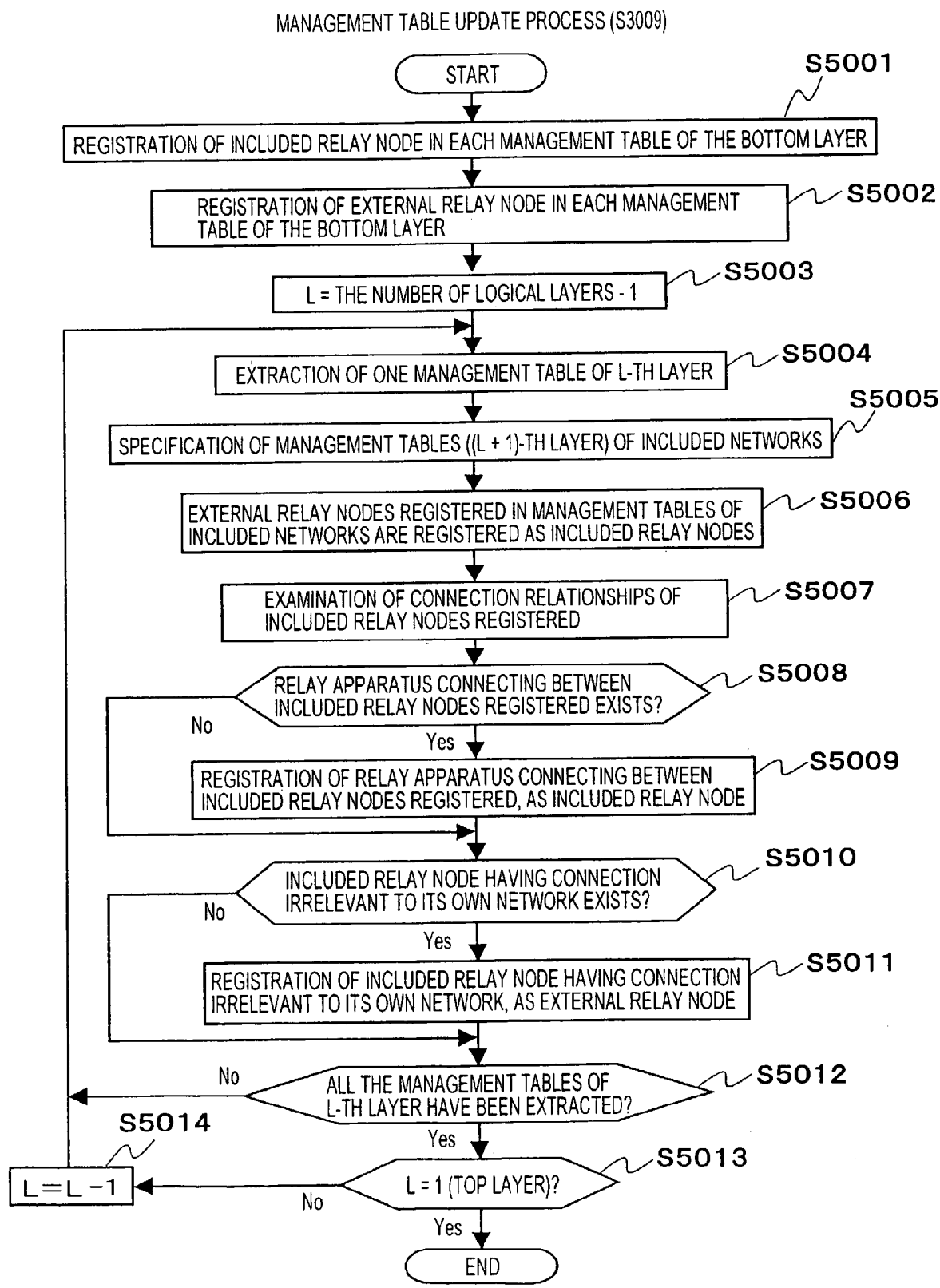
FIG. 11 is a flowchart for explaining S3010 (a management table update process) in FIG. 8.

FIG. 11 is a flowchart for explaining S3010 (the management table update process) in FIG. 8.

First, the configuration analysis unit 104 registers an included relay node into the entry 607 of each management table of the bottom layer (S5001). In detail, for each management table of the bottom layer, the configuration analysis unit 104 specifies a relay apparatus having the logical network address registered in the entry 604 of the management table in question, based on each element information of the relay apparatus collected by the information collection unit 102. Then, the identifier included in the element information of the specified relay apparatus is registered as the included relay node into the entry 607 of the management table.

Next, the configuration analysis unit 104 registers an external relay node into the entry 607 of each management table of the bottom layer (S5002). In detail, for each management table of the bottom layer, the configuration analysis unit 104 acquires the element information of the included relay node registered in the entry 607 of the management table in question, from the information collection unit 102, to examine the connection relationships of the included relay node. When the included relay node in question is connected with a network and/or relay apparatus having a logical network address other than the logical network address registered in the entry 604 of the management table in question, the included relay node is set as an external relay node and the identifier of including relay node is registered in the entry 608 of the management table in question.

Next, the configuration analysis unit 104 sets the variable L to the number of logical layers registered in the entry 505 of the address definition information file, minus 1 (the upper layer just over the bottom layer) (S5003). Then, the configuration analysis unit 104 extracts one management table whose entry 603 registers the hierarchical level L, from the management DB unit 101 (S5004).

Next, the configuration analysis unit 104 specifies management tables of the included networks in the lower layer (the (L+1)-th layer) included in the logical network corresponding to the extracted management table in the extracted L-th layer (S5005). In detail, all management tables each shoes entry 602 registers an identifier registered in the entry 605 of the extracted management table in the L-th layer.

Then, the configuration analysis unit 104 extracts the external relay node registered in the management table of each included network, and registers the identifier of the external relay node as an identifier of an included relay node, into the entry 607 of the extracted management table of the L-th layer (S5006).

Next, the configuration analysis unit 104 examines the connection relationships of the included relay nodes registered in the extracted management table of the L-th layer (S5007). In detail, the configuration analysis unit 104 acquires element information including an identifier registered in the entry 607 of the extracted management table of the L-th layer, from the information collection unit 102. Then, based on the acquired element information, the connection relationships of the included relay nodes are specified.

Next, when a plurality of included relay nodes are registered in the extracted management table of the L-th layer, the configuration analysis unit 104 further examines if there exists another relay apparatus connecting the included relay nodes, based on the examination results in S5007 (S5008). When such a relay apparatus exists, that relay apparatus is set as an included relay node, and the identifier of this relay apparatus is added to the entry 607 of the extracted management table of the L-th layer (S5009).

Then, for each included relay node registered in the extracted management table of the L-th layer, the configuration analysis unit 104 examines whether the included relay node in question is connected with a network and/or relay apparatus having a logical network address other than the logical network address registered in the entry 604 of the management table in question, namely, whether the included relay node in question has a connection relationship with a network or apparatus irrelevant to its own network (S5010). When there exists an included relay node having a connection relationship with a network or apparatus irrelevant to its own network, that included relay node is set as an external relay node, and the identifier of that included relay node is registered in the entry 608 of the management table in question (S5011).

In S5012, the configuration analysis unit 104 examines if all the management tables of the L-th layer have been extracted. If not, the flow returns to S5004. On the other hand, when all the management tables of the L-th layer have been extracted, the configuration analysis unit 104 further examines if the variable L indicates "1", the top layer (S5013). When the variable L indicates the top layer, the flow is ended. On the other hand, when the variable L does not indicate the top layer, the variable L is decremented by 1 (S5014), and the flow returns to S5004 to repeat the process.

Here, when a network element is a router, it is favorable that a routing table is included in the element information of the network element in question. And, in the above-described flow, connection of the network element may be examined by using the routing table.

Now, a management table generated by the network management apparatus 10 will be described taking an example where an address definition information file read into the network management apparatus 10 hierarchizes IPv6 network 20 in five logical layers.

Figure 12:
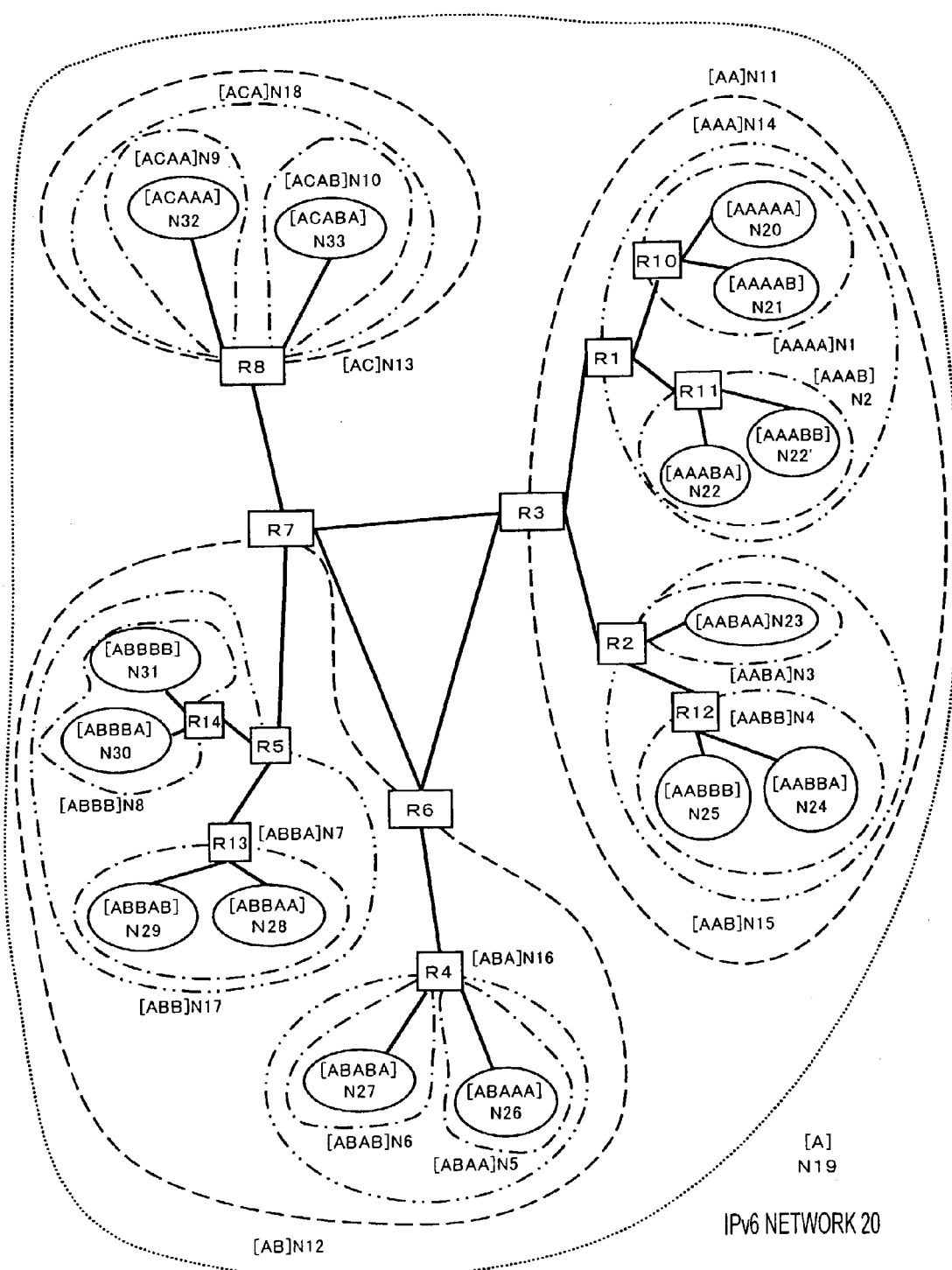
FIG. 12 is a diagram showing an example of a network configuration of the IPv6 network 20.

FIG. 12 is a diagram showing an example of a network configuration of an IPv6 network 20.

In the IPv6 network 20 shown in FIG. 12, brackets [ ] indicates a logical network address. A logical network address of 5 characters indicates a logical network address of the 5th layer, i.e., the bottom layer; a logical network address of 4 characters indicates a logical network address of the 4th layer; a logical network address of 3 characters indicates a logical network address of the 3rd layer; a logical network address of 2 characters indicates a logical network address of the 2nd layer; and a logical network address of 1 character indicates a logical network address of the 1st layer, i.e., the top layer. Further, a symbol N1–N33 shown besides each logical network address is a network identifier given to the logical network concerned.

Further, in FIG. 12, an area enclosed by a solid line shows a logical network of the 5th layer; an area enclosed by an one-dot chain line shows a logical network of the 4th layer; an area enclosed by a two-dot chain line shows a logical network of the 3rd layer; an area enclosed by a dashed line shows a logical network of the 2nd layer; and an area enclosed by a dotted line shows a logical network of the 1st layer. Further, a symbol R1–R14 is an identifier of each relay node.

FIG. 13 shows management tables of the logical networks in the 4th layer generated by the network management apparatus 10 in the case of the network configuration example shown in FIG. 12.

In FIG. 13, the logical network having the logical network address "AAAA" has the logical network identifier "N1" and the logical network identifiers "N20" and "N21" of the 5th layer are described as the included network identifiers. Further, the relay apparatus having the identifier "R10" is described as the included relay node. Here, the relay apparatus having the identifier "R10" has connection with the relay apparatus "R1" outside its own network. Accordingly, the identifier "R10" of this relay apparatus is described as an external relay node identifier related to the identifier "R1" of an another side apparatus of the connection. The other logical networks of the 4th layer are described similarly.

FIG. 14 shows management tables of the logical networks of the 3rd–1st layers generated by the network management apparatus 10 in the case of the network configuration shown in FIG. 12.

FIG. 14A shows management tables of the logical networks of the 3rd layer. In FIG. 14A, the logical network having the logical network address "AAA" has the logical network identifier "N14" and the logical network identifiers "N1" and "N2" of the 4th layer are described as the included network identifiers. Further, the identifiers "R10", "R11" and the identifier of the relay apparatus "R1" are described as the included relay nodes. The identifiers "R10" and "R11" are identifiers registered as the external relay nodes in the management tables of the included networks "N1" and "N2", respectively. The relay apparatus having the identifier "R1" connects between the relay apparatus having the identifier "R10" and the relay apparatus having the identifier "R11". Among those relay apparatuses, the relay apparatus having the identifier "R1" has connection with the relay apparatus "R3" outside its own network. "R1:R3" in the entry of external relay node identifier is described that the identifier "R1" of the relay apparatus has relation with the identifier "R3" as identifier of external relay node. The other logical networks of the 3rd layer are described similarly.

FIG. 14B shows management tables of the logical networks of the 2nd layer. In FIG. 14B, the logical network having the logical network address "AA" has the logical network identifier "N11" and the logical network identifiers "N14" and "N15" of the 3rd layer are described as the included network identifiers. Further, the identifiers "R1", "R2" and the identifier of the relay apparatus "R3" are described as the included relay nodes. The identifiers "R1" and "R2" are registered as the external relay nodes in the management tables of the included networks "N14" and "N15", respectively. The identifier of the relay apparatus "R3" connects between the relay apparatus having the identifier "R1" and the relay apparatus having the identifier "R2". Among those relay apparatuses, the relay apparatus having the identifier "R3" has connection with the relay apparatuses "R6" and "R7" outside its own network. "R3: R6, R7" in the entry of external relay node identifier is described that the identifier "R3" of the relay apparatus has relations with the identifiers "R6" and "R7" as identifier of external relay nodes. The other logical networks of the 2nd layer are described similarly.

FIG. 14C shows the management table of the logical network of the 1st layer (the top layer). In FIG. 14C, the logical network of the 1st layer has the logical network address "A" and the logical network identifier "N19". And, the logical network identifiers "N11", "N12" and "N13" of the 2nd layer are described as the included network identifiers. And, the identifiers "R3", "R6", "R7" and "R8" registered as the external relay nodes in the management tables of the included networks "N11", "N12" and "N13" are described as the included relay nodes.

Next, network monitoring screen generation process for each logical network will be described.

Figure 15:
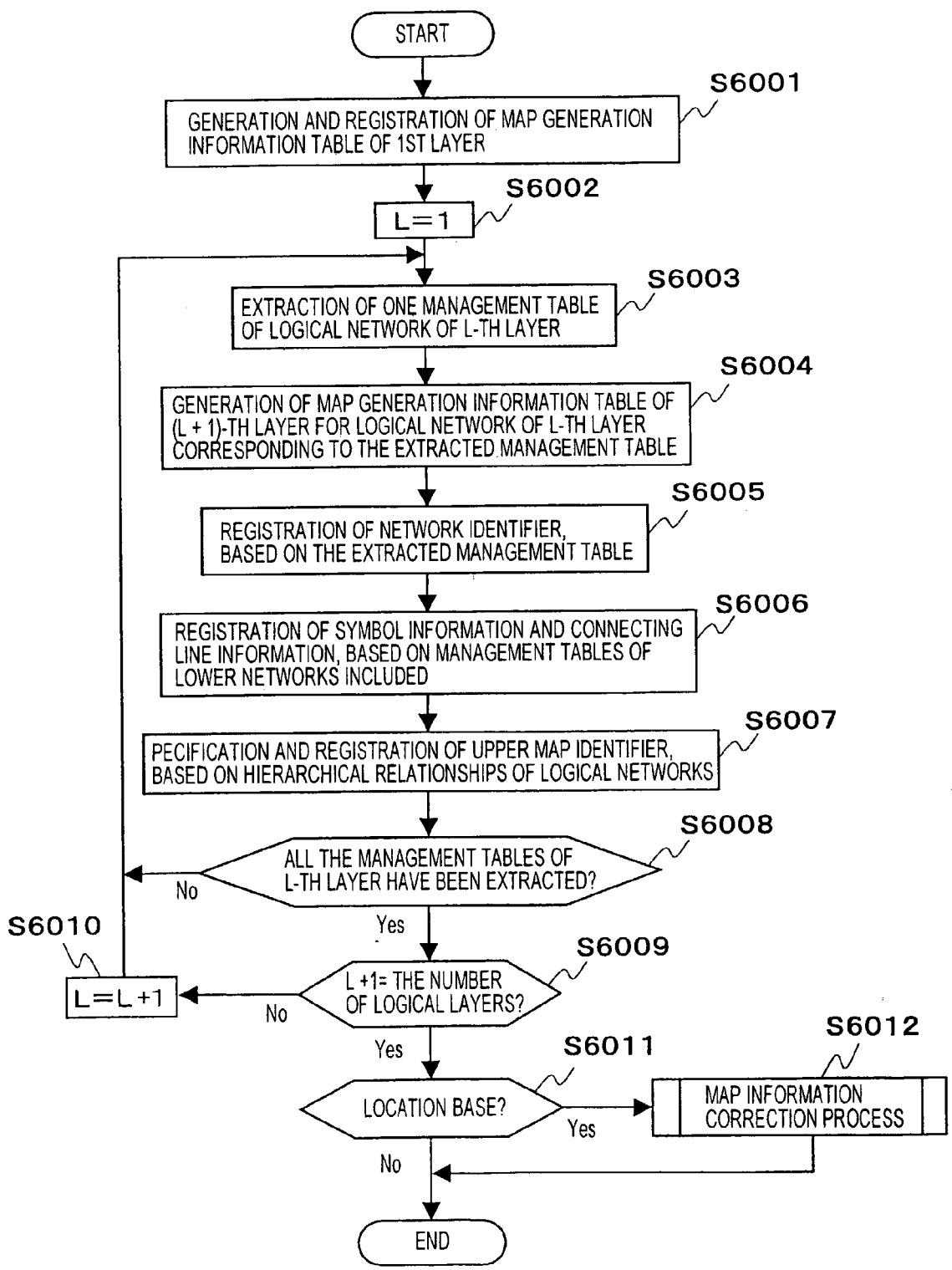
FIG. 15 is a flowchart for explaining the network monitoring screen generating process on the network management apparatus 10.

FIG. 15 is a flowchart for explaining network monitoring screen generation process of the network management apparatus 10.

First, in the network management apparatus 10, the monitoring screen generation unit 105 generates a map generation information table for registering information required for generating a network monitoring screen of the logical network in the 1st layer (the top layer).

FIG. 16 shows an example of a configuration of a map generation information table.

In FIG. 16, an entry 702 registers a map identifier (for example, a nickname) for identifying this map generation information table.

An entry 703 registers a network identifier of the logical network that is the object of this map generation information table.

An entry 704 registers a map identifier of the map generation information table of the logical network positioned in the upper layer just over the object logical network of this map generation information table, in the logical hierarchy.

An entry 705 registers types (logical network/relay node) and identifiers of symbols to be displayed on a network monitoring screen.

And, an entry 706 registers connecting line information (information on a pair of symbols connected by a connecting line) between symbols registered in the entry 705 together with an identifier (for example, nickname) of the connecting line.

The monitoring screen generation unit 105 registers and holds a uniquely-generated map identifier and symbol information representing the logical network of the first layer (only one logical network exists in the 1st layer) respectively in the entries 702 and 705 of a map generation information table generated (a network identifier in the management table of the 1st layer is used for the identifier) (S6001). In the case of the map generation information table of the 1st layer, the other entries are blank.

Next, the monitoring screen generation unit 105 sets the variable L to "1" (S6002). Then, one management table of the L-th layer is read from the management DB unit 101 (S6003). And, in order to generate a network monitoring screen indicating a network configuration (in the configuration in the (L+1)-th layer) in the L-th layer logical network specified by the extracted management table, a map generation information table for registering required information is generated. (S6004).

Next, the monitoring screen generation unit 105 registers a uniquely-generated map identifier into the entry 702 of the generated map generation information table. Further, the network identifier registered in the entry 602 of the extracted management table is registered into the entry 703 of the map generation information table (S6005).

Further, as symbol information, the monitoring screen generation unit 105 registers the included network identifiers registered in the entry 605 of the extracted management table into the entry 705 of the generated map generation information table, together with information indicating the logical networks. Further, also as symbol information, the monitoring screen unit 105 registers the included relay node identifiers registered in the entry 607 of the extracted management table into the entry 705 of the generated map generation information table, together with information indicating the relay apparatuses.

Further, the monitoring screen generation unit 105 specifies each management tables of the (L+1)-th layer that the included network identifiers registered in the entry 605 of the extracted management table of the L-th layer are respectively registered in the entries 602, as the network identifiers. Then, based on the connection relationships of the external relay nodes registered in the entries 608 of the above-specified management tables of the (L+1)-th layer, and the connection relationships of the external relay nodes registered in the entry 608 of the extracted management table of the L-th layer, the monitoring screen generation unit 105 specifies connecting line relationships between symbol information items (i.e., between a logical network and a relay apparatus, and/or between a relay apparatus and a relay apparatus) registered in the entry 705 of the generated map generation information table, and generates the connecting line information.

In detail, for each of the specified management tables of the (L+1)-th layer, the monitoring screen generation unit 105 generates connecting line information indicating line connection between the symbol information item representing the network of this management table and a symbol information item representing an external relay node registered in this management table. Further, as the connection partners of this external relay node, when there exists an identifier of a relay apparatus added a symbol information item to the entry 705 of the map generation information table, the monitoring screen generation unit 105 generates connecting line information indicating line connection between the symbol information items representing the external relay node and the relay apparatus. Further, in the case where a connection relationship between relation apparatuses added symbol information items to the entry 705 of the map generation information table is registered in the entry 608 of the extracted management table of the L-th layer, connecting line information indicating line connection between the symbol information items representing these relay apparatuses is generated.

The monitoring screen generation unit 105 registers the connecting line information generated above into the entry 706 of the map generation information table (S6006).

Further, the monitoring screen generation unit 105 specifies a network identifier registered in the entry 602 of a management table having the network identifier registered in the entry 703 as included network identifiers. Then, the specified network identifier specifies a map generation information table registered in entry 703, and the map identifier registered in the entry 702 of this table is registered into the entry 704, as the upper map identifier (S6007). However, when the variable L is "1", namely, when the map generation information table is generated based on the management table of the top layer, the map identifier registered in the entry 702 of the map generation information table generated in S6001 is registered in the entry 704 as the upper map identifier.

When the information is registered in the map generation information table as described above, the monitoring screen generation unit 105 holds the map generation information table.

Next, the monitoring screen generation unit 105 judges if all the management tables of the L-th layer have been read from the management DB unit 101 in S6003 (S6008). If not, the flow returns to S6003. On the other hand, if all the management tables have been read, the monitoring screen generation unit 105 confirms if the value of the variable L plus one reaches the number of logical layers registered in the address definition information file (S6009). If not, the variable L is incremented by one (S6010) and the flow returns to S6003.

On the other hand, when the value of the variable L plus one reaches the number of logical layers registered in the address definition information file, the monitoring screen generation unit 105 confirms if the network monitoring screen generation policy "Policy" registered in the address definition information file is "Location Base" meaning that the same logical network is represented by different symbols for different geographic locations (S6011). If not (namely, when the generation policy "policy" is "Group Base" meaning that the same logical network is represented by one symbol), this flow is ended. If the generation policy is "Location Base", the map information collection process mentioned below is performed (S6012), before this flow is ended.

Now, map generation information tables generated by the network management apparatus 10 will be described taking an example where the management tables are ones shown in FIGS. 13 and 14, and the network monitoring screen generation policy "Policy" is "Group Base" meaning that the same logical network is represented by one symbol.

Figure 17:
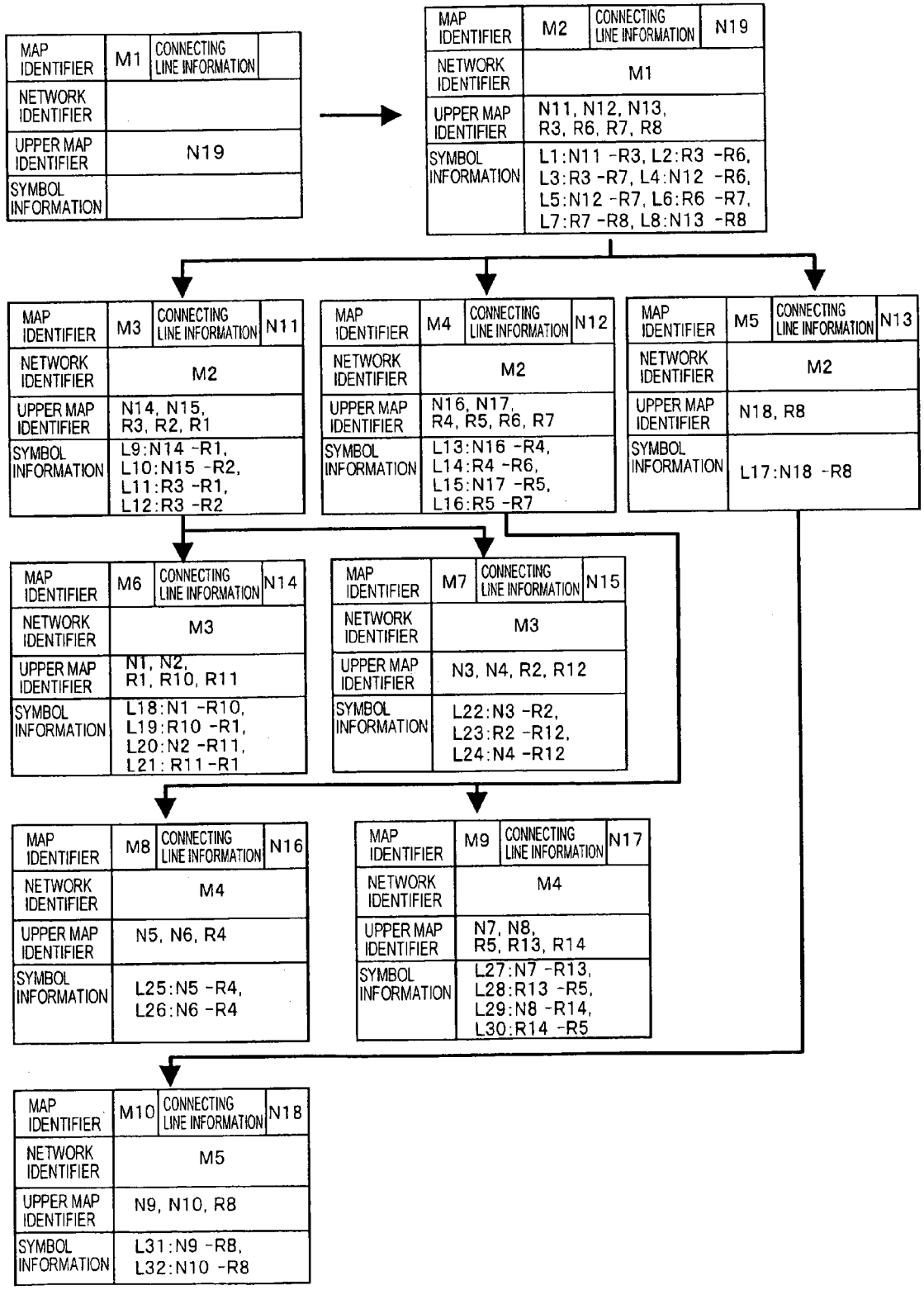
FIG. 17 is a diagram for explaining map information generation tables generated based on the management tables shown in FIGS. 13 and 14, and for explaining hierarchical relationships between those map information generation tables, when "Policy" for a network monitoring screen generation is "Group Base"

FIG. 17 is a diagram for explaining map information generation tables generated based on the management tables shown in FIGS. 13 and 14, and for explaining hierarchical relationships between those map information generation tables in case that the network monitoring screen generation policy "Policy" is "Group Base".

For example, in FIG. 17, the map information generation table having the map identifier "M4" is a table for generating a network monitoring screen indicating a network configuration of the logical network having the network identifier "N12". As the symbol information, this logical network includes the logical networks "N16" and "N17" and the included relay nodes "R4", "R5", "R6" and "R7". And, as the connecting line information, this logical network has the connecting line "L13" between the logical network "N16" and the included relay node "R4", the connecting line "L14" between the included relay node "R4" and the included relay node "R6", the connecting line "L15" between the logical network "N17" and the included relay node "R5", and the connecting line "L16" between the included relay node "R5" and the included relay node "R7".

Figure 18:
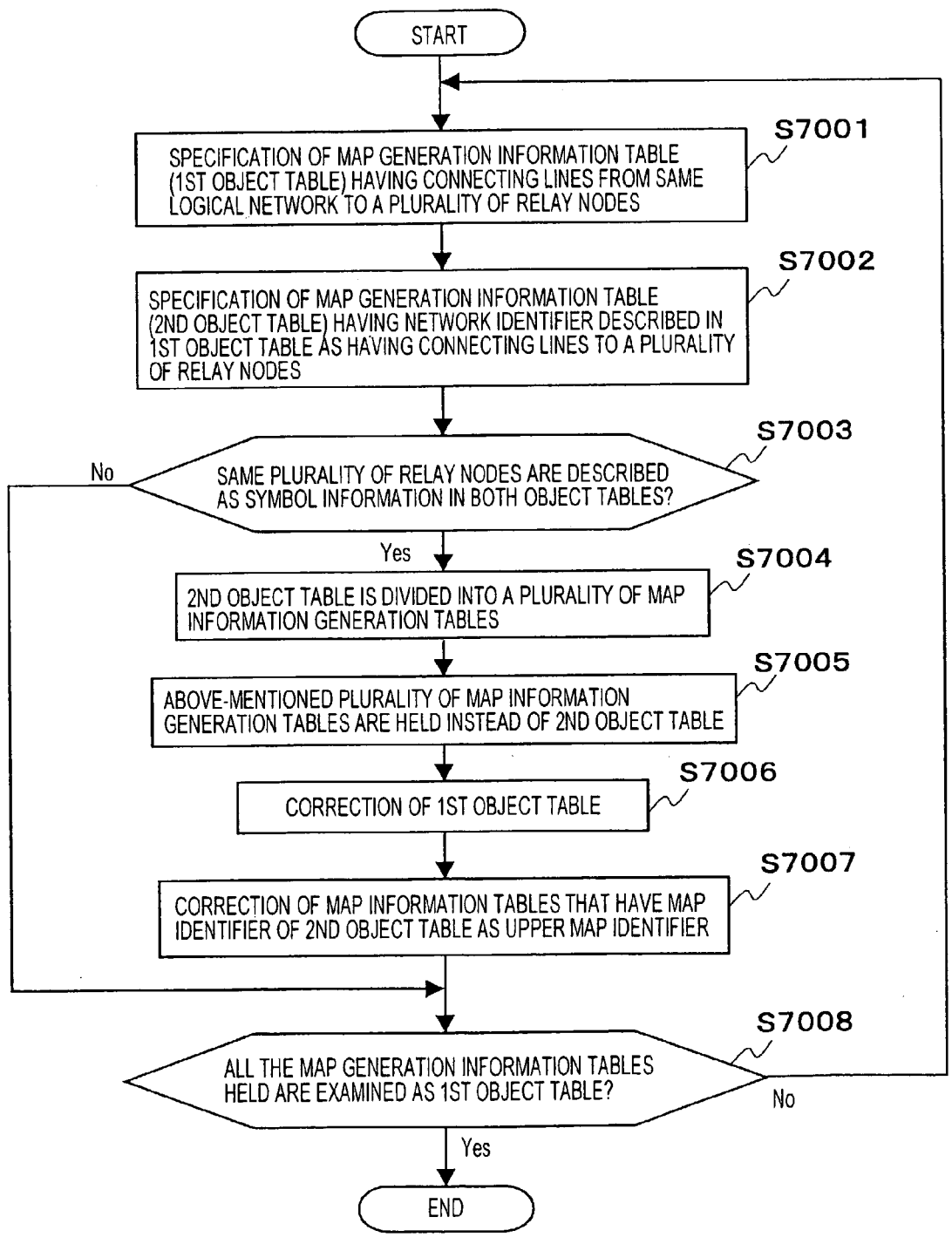
FIG. 18 is a flowchart for explaining S6012 (a map information correcting process) in FIG. 15.

FIG. 18 is a flowchart for explaining S6012 (the map "information correction process") of FIG. 15.

First, in the network management apparatus 10, the monitoring screen generation unit 105 examines connecting line information of each map generation information table that the unit 105 holds, to specify the map generation information table (hereinafter, referred to as the first object table) that has connecting lines from the same logical network to a plurality of relay nodes (S7001).

For example, in FIG. 17, the map information generation table having the map identifier "M2" includes the connecting line information "L4" between the logical network "N12" and the relay node "R6" and the connecting line information "L5" between the logical network "N12" and the relay node "R7". Thus, this map information generation table having the map identifier "M2" is specified as the first object table.

Next, the monitoring screen generation unit 105 specifies such network identifier describing the connecting line information to a plurality of relay nodes in the first object table, and specifies the map generation information table (hereinafter, referred to as the second object table) having specified network identifier (S7002).

For example, in FIG. 17, when the map information generation table having the map identifier "M2" is specified as the first object table, the map generation information table (the map identifier "M4") having a network identifier "N12" describing the connecting line information to the respective relay nodes "R6" and "R7" is specified as the second object table.

Next, the monitoring screen generation unit 105 examines whether both the first and second object tables, describe the same plurality of relay nodes in their symbol information (S7003).

When the same plurality of relay nodes are described as the symbol information in both the first and second object tables, there is a good possibility that, in the second object table, logical networks connected respectively to these relay nodes are positioned at different geographic locations. This is because, when a certain logical network is not separated geographically, it is general that the logical network is connected to the outside through only one connecting line. In that case, relay nodes that are set in the symbol information of the second object table are included in logical networks in the first object table, without being set in the symbol information.

For example, in FIG. 17, both of the map information generation table (the first object table) having the map identifier "M2" and the map information generation table (the second object table) having the map identifier "M4" describe the same plurality of relay nodes "R6" and "R7" as their symbol information. Thus, there is good possibility that the logical networks "N16" and "N17" connected respectively to the relay nodes "R6" and "R7" are positioned at different geographic locations.

In such a case, the monitoring screen generation unit 105 divides the second object table into a plurality of map information generation tables (S7004).

In detail, map information generation tables are generated by the number of the relay nodes described as symbol information in both the first and second object tables. As the upper map identifier of those tables, the upper map identifier of the second object table is used as it is. Then, the each map information generation tables are given with a newly-generated map identifier and a newly-generated network identifier. Further, one relay node of the same plurality of relay nodes described as the symbol information in both the first and second object tables, the network identifier of the logical network connected to the relay node in question, and the external relay node identifier of that logical network are registered in each map information generation table. Further, connecting line information on connecting lines between the relay node, the logical network and the external relay node is registered.

For example, in FIG. 17, map information generation tables are generated by the number (two) of the relay nodes "R6" and "R7" that are described as symbol information in both of the map information generation table (the first object table) having the map identifier "M2" and the map information generation table (the second object table) having the map identifier "M4".

Then, one of the map information generation tables is given with a newly-generated map identifier "M41" and a newly-generated network identifier "N121". Further, the identifier "R6" of a relay node described as symbol information in both object tables and the network identifier "N16" of the logical network connected to that relay node "R6" are registered as the symbol information. The connecting line information with respect to the relay node "R6" is also registered.

Then, the other map information generation table is given with a newly-generated map identifier "M42" and a newly-generated network identifier "N122". Further, the identifier "R7" of a relay node described as symbol information in both object tables and the network identifier "N17" of the logical network connected to that relay node "R7" are registered as the symbol information. The connecting line information with respect to the relay node "R7" is also registered.

When the second object table has been divided into a plurality of map information generation tables as described above, the monitoring screen generation unit 105 holds these tables instead of the second object table (S7005).

Next, the monitoring screen generation unit 105 collects the first object table (S7006). In detail, the network identifier of the second object table that is registered as symbol information is changed to the network identifiers of the generated map information generation tables. Together with this change, the connecting line information with respect to each relay node registered in the symbol information is updated.

For example, in the map information generation table (the first object table) having the map identifier "M2" in FIG. 17, the network identifier "N12" described as symbol information is changed to "N121" and "N122". Further, the connecting line information "L4" is changed to connecting line information between the logical network "N121" and the relay node "R6", and the connecting line information "L5" is changed to connecting line information between the logical network "N122" and the relay node "R7".

Then, the monitoring screen generation unit 105 collects map information generation tables having upper map identifiers as the map identifier of the second object table (S7007). In detail, in each of those map information generation tables, the upper map identifier is changed to the map identifier of the map information generation table having symbol information includes the network identifier of the map information generation table in question.

For example, in FIG. 17, the upper map identifier of the map information generation table having the map identifier "M8" is changed to the map identifier "M41" of the map information generation table having symbol information includes the network identifier "N16" of this map information generation table. Similarly, the upper map identifier of the map information generation table having the map identifier "M9" is changed to the map identifier "M42" of the map information generation table having symbol information includes the network identifier "N17" of this map information generation table.

Now, the monitoring screen generation unit 105 continues the process until every map generation information table held by the monitoring screen generation unit 105 has been examined as a first object table in S7001 (S7008).

Here, map generation information tables generated by the network management apparatus 10 will be described taking an example where the management tables are ones shown in FIGS. 13 and 14 and the network monitoring screen generation policy "Policy" is "Location Base" meaning that the same logical network is represented by different symbols for different geographic locations.

Figure 19:
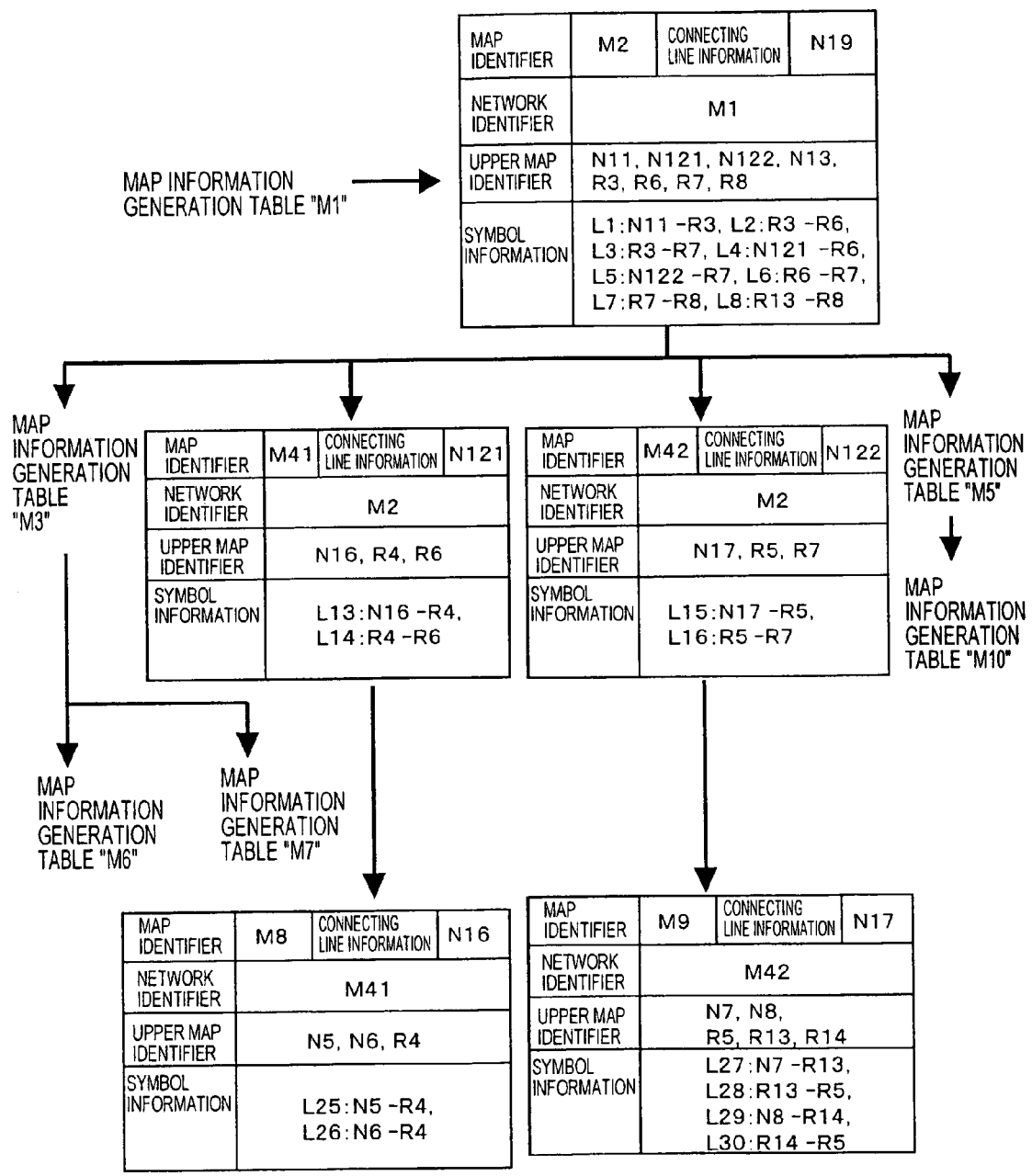
FIG. 19 is a diagram for explaining map information generation tables generated based on the management tables shown in FIGS. 13 and 14, and for explaining hierarchical relationships between those map information generation tables, when "Policy" for the network monitoring screen generation policy is "Location Base"

FIG. 19 is a diagram for explaining map information generation tables generated based on the management tables shown in FIGS. 13 and 14, and for explaining hierarchical relationships between those map information generation tables, in the case where the network monitoring screen generation policy "Policy" is "Location Base". Here shows details of only tables having different configurations from the map information generation tables shown in FIG. 17.

Although, in the flow shown in FIG. 18, the second object table is divided into a plurality of tables, the second table may be held as it is. And, in the first object table, the symbol information of a logical network connected with a plurality of relay nodes may be added with attribute information indicating that symbols are to be displayed separately for each of the plurality of relay nodes. Namely, the map information generation tables are same shown in FIG. 17. However, in the map information generation table of the map identifier "M2", the symbol information "N12" is added with attribute information indicating that symbols are displayed separately for each of the connection partner relay nodes "R6" and "R7". In that case, only the network monitoring screen generated based on the map information generation table having the map identifier "M2" is different between the case where the network monitoring screen generation policy "Policy" is "Location Base" and the case where "Policy" is "Group Base".

Next, network monitoring screen display process will be described.

Figure 20:
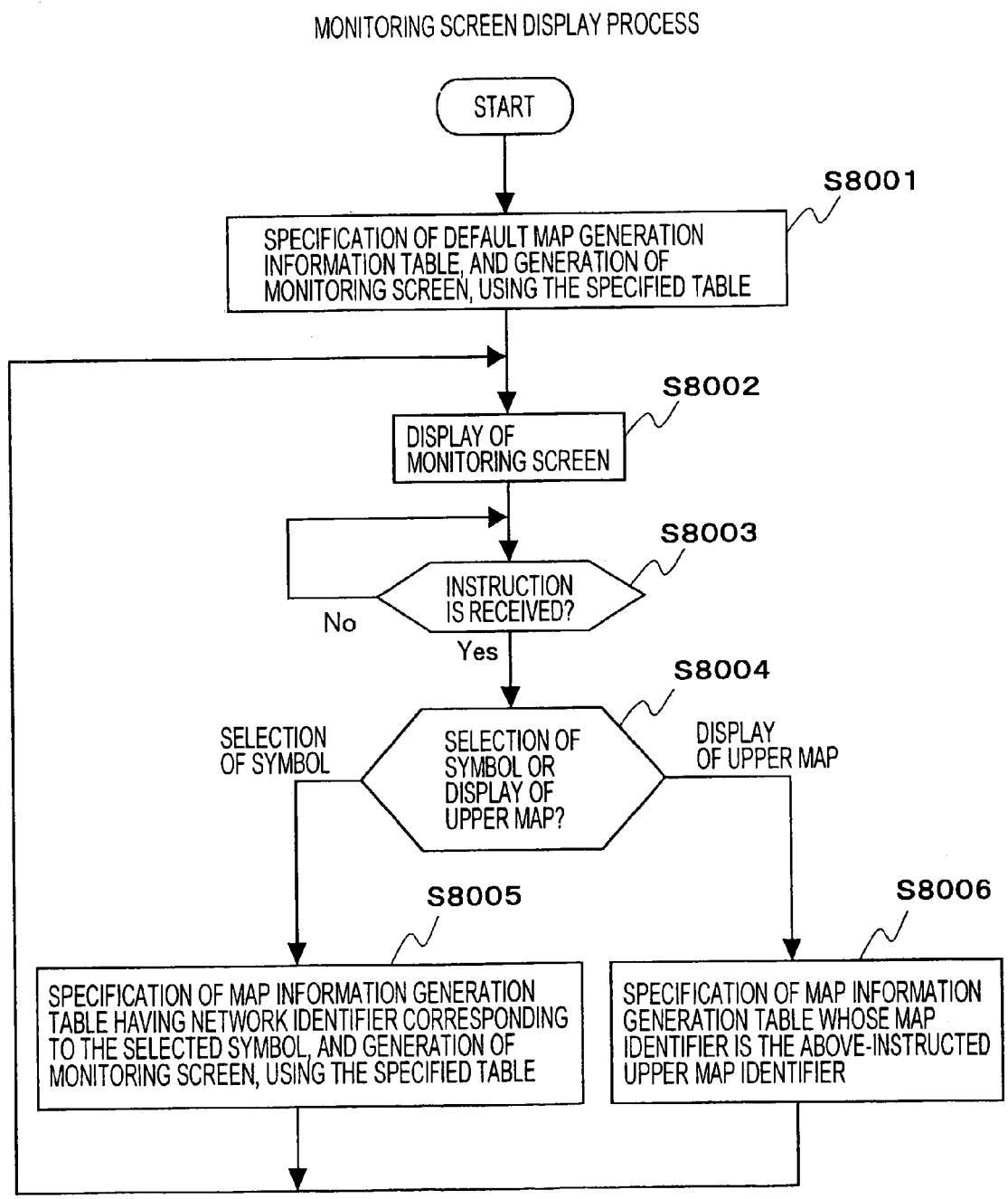
FIG. 20 is a flowchart for explaining display process of the network monitoring screen by the network management apparatus 10.

FIG. 20 is a flowchart for explaining the network monitoring screen display process by the network management apparatus 10.

First, the monitoring screen generation unit 105 generates a network monitoring screen, using a map information generation table (for example, the top map generation information table that does not register an upper map identifier) determined as the default (S8001). Then, the generated network monitoring screen is displayed on the display unit 106 (S8002), while awaiting operator's selection of a symbol representing a network in the monitoring screen through the instruction reception unit 107 or operator's input of an instruction to move to the upper map (S8003).

When a symbol representing a network is selected (S8004), the map generation information table that registers the network identifier of the selected network is specified, and a network monitoring screen is generated using the specified map generation information table (S8005). Then, the flow returns to S8002.

On the other hand, when an instruction to move to the upper map is selected (S8004), the upper map identifier registered in the map information generation table and based of the network monitoring screen on display is read. Then, the map generation information table that registers this upper map identifier as its map identifier is specified, and a network monitoring screen is generated using the specified map generation information table (S8006). Then, the flow returns to S8002.

Now, network monitoring screens displayed by the network management apparatus 10 according to the flow of FIG. 20 will be described taking an example where the map information generation tables are ones shown in FIG. 17.

Figure 21:
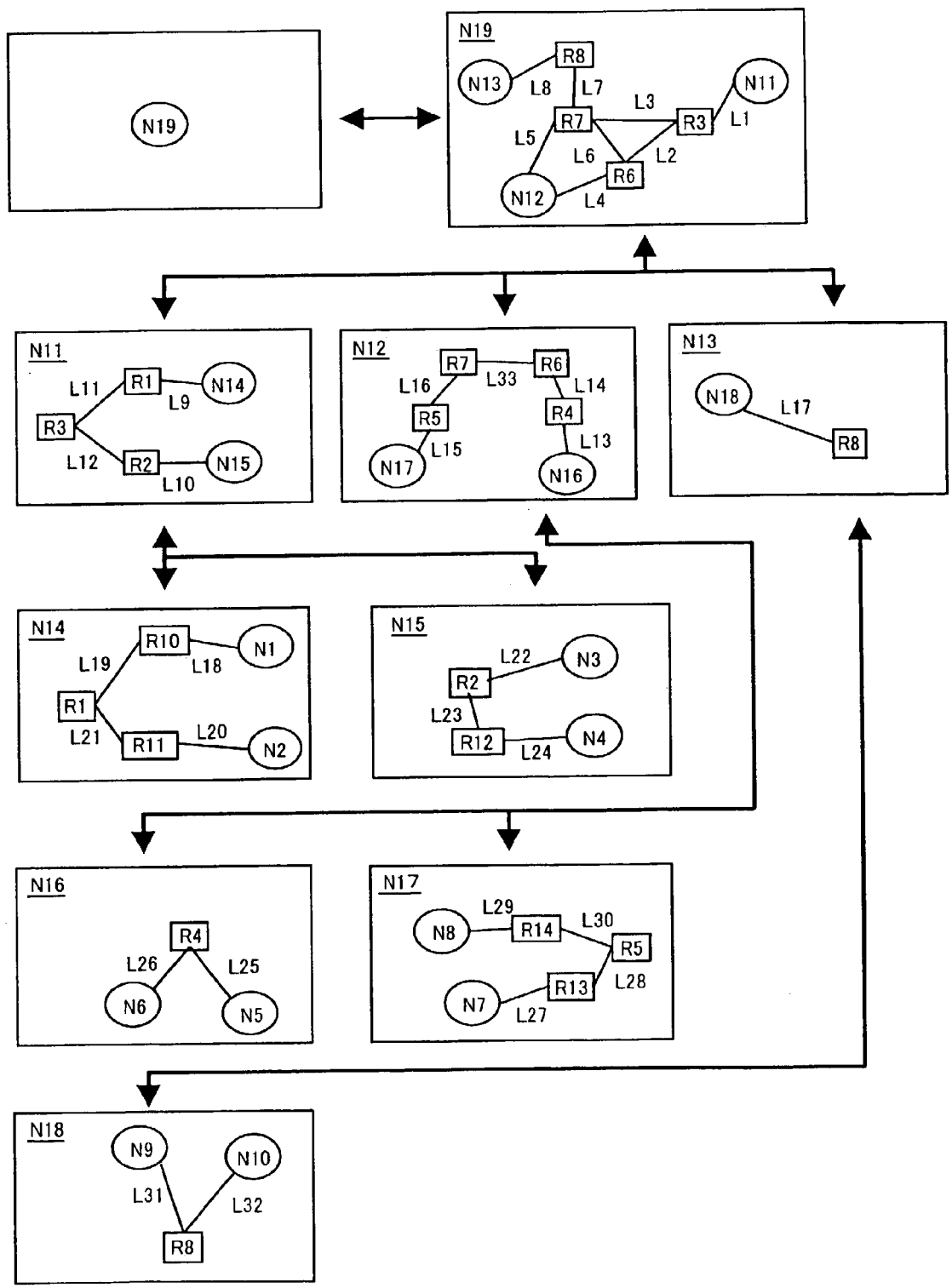
FIG. 21 is a diagram for explaining network monitoring screens displayed based on the map information generation tables shown in FIG. 17, and for explaining hierarchical relationships between those screens.

FIG. 21 is a diagram for explaining network monitoring screens displayed based on the map information generation tables shown in FIG. 17, and for explaining hierarchical relationships between those screens.

In FIG. 21, when a user selects a symbol displayed in a network monitoring screen, display moves to the network monitoring screen (a network monitoring screen is one layer lower than the displayed screen) corresponding to the selected symbol. On the other hand, when a user instructs to display the upper map, display moves to the network monitoring screen that is one layer upper than the current network monitoring screen on display.

For example, in FIG. 21, a network monitoring screen generated based on the map information generation table of the map identifier "M4" is the screen showing the logical network identifier "N12" at its upper left. The identifiers "N16", "N17", "R4", "R5", "R6" and "R7" registered as the symbol information in the map information generation table of the map identifier "M4", are displayed together with graphic forms (circle/rectangle) indicating types (network/relay apparatus) of symbols. Further, the symbols are connected with one another by lines according to the connecting line information "L13", "L14", "L15", "L16" and "L33".

Next, network monitoring screens displayed by the network management apparatus 10 according to the flow of FIG. 20 will be described taking an example where the map information generation tables are ones shown in FIG. 19.

Figure 22:
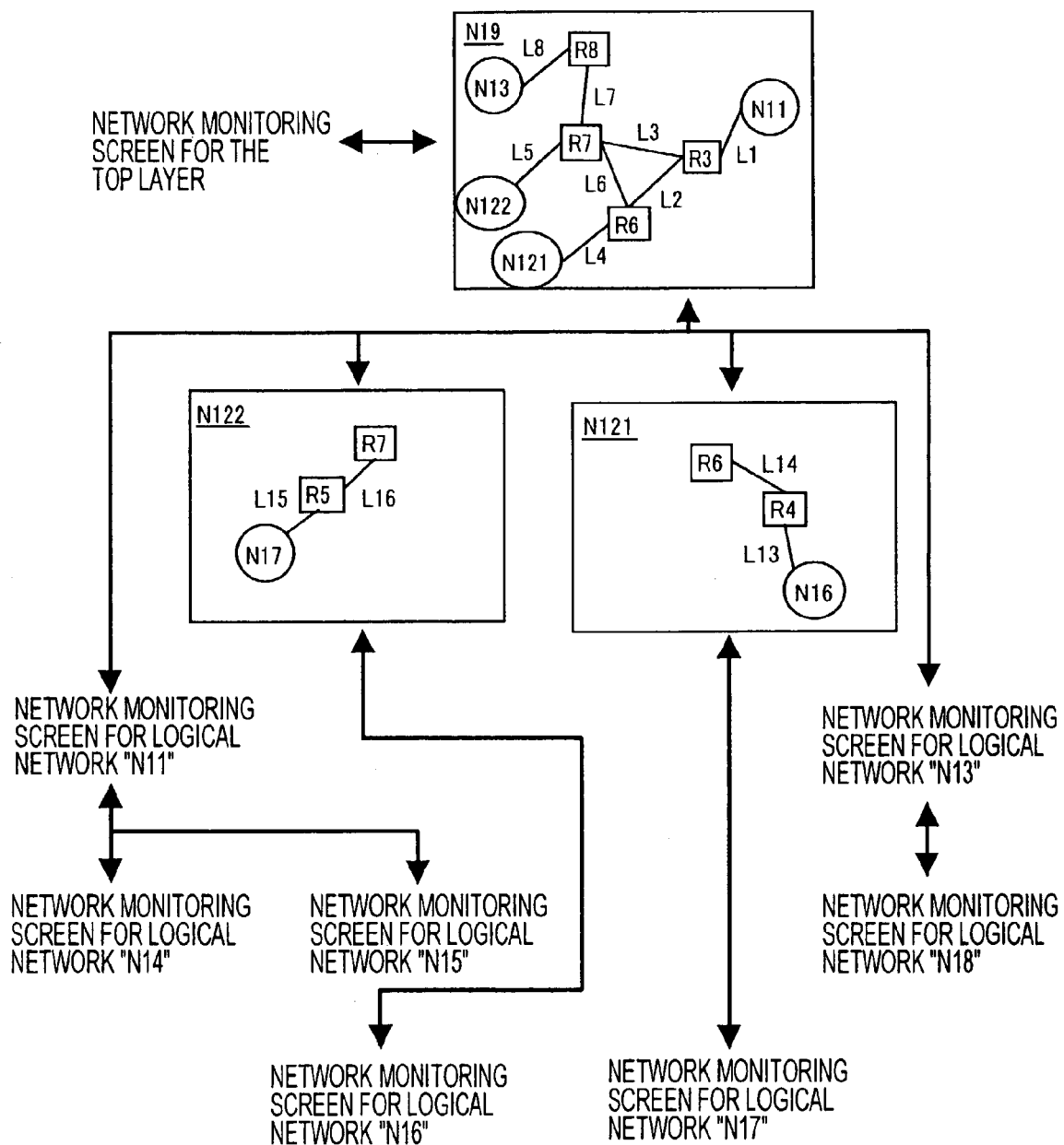
FIG. 22 is a diagram for explaining network monitoring screens displayed based on the map information generation tables shown in FIG. 19, and for explaining hierarchical relationships between those screens.
Figure 23:
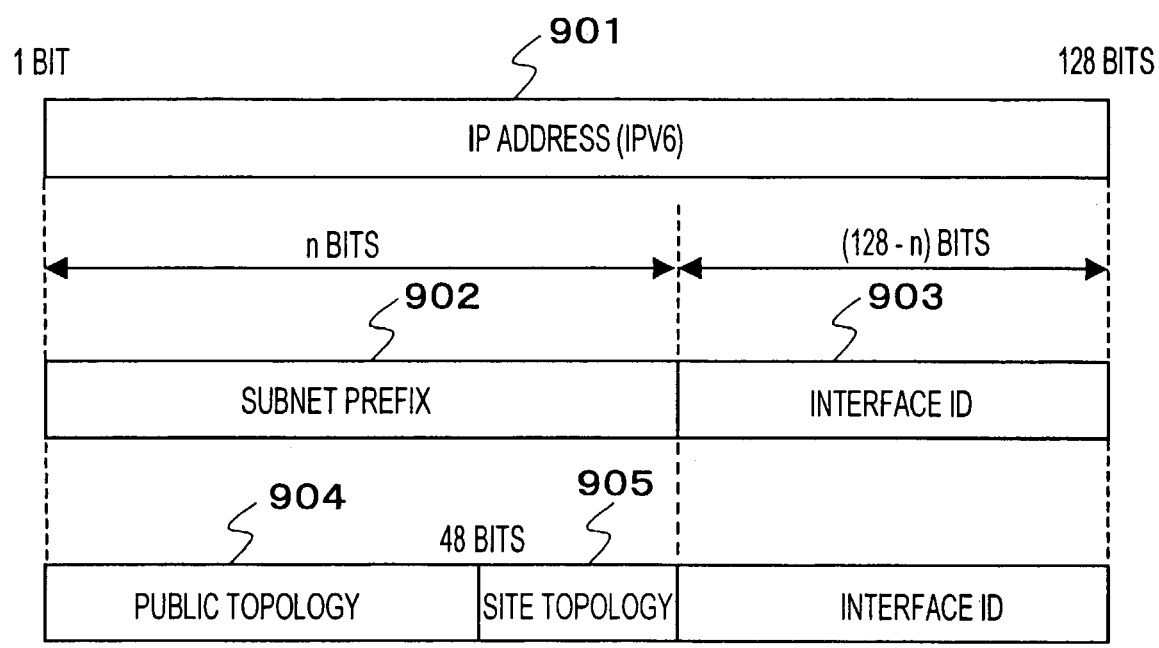
FIG. 23 is a diagram for explaining an address configuration for an IPv6 network.

FIG. 22 is a diagram for explaining network monitoring screens displayed based on the map information generation tables shown in FIG. 19 and for explaining hierarchical relationships between those screens.

Similarly to FIG. 21, in FIG. 22 also, when a user selects a symbol displayed in a network monitoring screen, display moved to the network monitoring screen (a network monitoring screen is one layer lower than the displayed screen) corresponding to the selected symbol. On the other hand, when a user instructs to display the upper map, display moves to the network monitoring screen that is one layer upper than the current network monitoring screen on display.

FIG. 22 shows details of only the display contents different from the network monitoring screens shown in FIG. 21. As shown in the figure, in the network monitoring screen for the logical network "N19", the logical network "N12" displayed by one symbol in FIG. 21 is displayed as two geographically separated logical networks "N121" and "N122".

Last, the process when a network configuration is changed due to addition/deletion of a network element to/from an IPv6 network 20, after generation of management tables and map information generation tables is ended once, will be described.

In that case, of course, management tables and map information generation tables may be regenerated by performing a series of processes described above again. However, it takes time to perform all the processes again each time the network configuration changes. Thus, in that case, management tables and map information generation tables may be regenerated only for parts where the network configuration changes.

The parts where the network configuration changes are extracted as follows, for example.

Namely, when the information collection unit 102 detects deletion of a network element from a change of the own element information, the configuration analysis unit 104 is informed that effect. The configuration analysis unit 104 specifies the management table having entry 604 registers the logical network address of the bottom layer for the deleted network element, among the management tables of the bottom layer. Then, the identifier of the deleted network element is deleted from the included relay nodes of the specified management table.

Further, when the information collection unit 102 detects addition of a network element from a change of the own element information, the configuration analysis unit 104 is informed that effect. The configuration analysis unit 104 performs the flows shown in FIGS. 10 and 11 only with respect to an IP address of the element information of the network element informed.

Hereinabove, an embodiment of the present invention has been described.

The network management apparatus 10 of the present embodiment collects element information including an IP address assigned to the network element concerned, from each network element as a constituent of an IPv6 network 20. Further, from an operator, the network management apparatus 10 acquires an address definition information file defining the logical hierarchical structure of the IPv6 network 20 specified by an IP address assigned to each network element. Then, the IPv6 network 20 is logically hierarchized based on this address definition information file, the network elements are classified into logical networks for each logical layer based on an IP address collected from each network element, and management tables defining hierarchical relationships between the logical networks are generated. Further, for each logical network, a map information generation table registrating information required for generating a network monitoring screen representing the configuration of the logical network is generated according to the hierarchical relationships of the logical networks described in the generated management tables.

Thus, the network management apparatus 10 of the present embodiment can receive an address definition information file defining logical hierarchical structure of an IPv6 network 20, from an operator. And, hierarchical relationships of the logical networks are defined based on the address definition information file received from the operator and an IP address collected from each network element belonging to the IPv6 network.

Accordingly, with respect to also an IPv6 network whose number of logical layers can be changed by setting a site topology, it is possible that the configuration of that network is represented hierarchically by network monitoring screens, the number of which depends on the number of the logical layers of that network. In other words, it is possible to provide monitoring screens that includes actual networks, conforms with hierarchical structure, and is easily graspable to an operator. Thus, a monitoring load of an operator can be reduced.

Further, according to the network management apparatus 10 of the present embodiment, when the same logical network is connected to a plurality of relay nodes and lower logical networks that are included by that logical network and belong to the layer just under that logical network are connected to the above-mentioned plurality of relay nodes respectively, or, in other words, when the same plurality of relay nodes are described as symbol information in both two map information generation tables having the upper-and-lower relationship between them in the hierarchical structure, there is a good possibility that the lower layer logical networks connected respectively to those relay nodes are positioned at geographically different locations. Thus, the logical network indicated as one logical network from the viewpoint of the logical network address and includes those lower logical networks can be displayed being divided into logical networks corresponding to respective relay nodes.

Thus, according to the network management apparatus 10 of the present embodiment, logical networks indicated as the same from the viewpoint of logical network address can be displayed separately according to difference in location.

The present invention is not limited to the above-described embodiment, and various modifications can be made within the scope of the invention.

For example, the above embodiment has been described taking an IPv6 network as an example. However, the present invention is not limited to this. The present invention can be widely applied to configuration management of a network for which the number of logical network layers can be set flexibly.

As described above, the present invention can provide a technique that is appropriate for configuration management of a network in which the number of logical network layers can be set.

What is claimed is:

1. A network management apparatus for managing a network configuration, comprising:
 a collection means for collecting addresses assigned respectively to network elements belonging to a managed network, from said network elements, an acquisition means for acquiring address definition information that defines a logical hierarchical structure of the managed network, a configuration analysis means for classifying the address of the network elements collected by said collection means into logical networks in each of logical layers of the managed network specified by the address definition information acquired by said acquisition means, and for defining hierarchical relationships between the logical networks, and a monitoring screen generation means for generating information of a network monitoring screen for each logical network representing a network configuration in a layer just under the logical network in question, according to the hierarchical relationships of said logical network defined by said configuration analysis means, wherein:

said collection means collects element information including an address, connection relationships and element type of the network element in question, from each network element belonging to the managed network, said configuration analysis means defines relay nodes included in each logical network classified by said address definition information according to the element information collected by said collection means from each network element, and defines connection relationships between said relay nodes, and said monitoring screen generation means generates information of a network monitoring screen for each logical network by using symbols representing logical networks, referred to as lower-side logical networks, included in the logical network in question and belonging to a layer just under the logical network in question, symbols representing relay nodes included in the logical network in question, and symbols representing connections between the lower-side logical networks and the relay nodes, in order to display said network monitoring screen that represents the network configuration.

2. The network management apparatus according to claim 1, wherein:

said configuration analysis means divides a logical network including at least two lower-side logical networks that are positioned probably at different locations, according to said locations, and defines hierarchical relationships of said lower-side logical networks.

3. The network management apparatus according to claim 2, wherein:

said configuration analysis means judges it possible that said lower-side logical networks are respectively positioned at different locations from one another when in a certain logical layer, a plurality of relay nodes connected with a same logical network exists and in a lower layer just under said logical network, said plurality of relay nodes are defined as relay nodes connected respectively to lower-side logical networks included in said logical network.

4. The network management apparatus according to claim 1, wherein:

said monitoring screen generation means displays a network configuration according to the information of a network monitoring screen, and when an operator selects a symbol representing a lower-side logical network included in the network configuration on display, said monitoring screen generation means displays a network configuration on a display unit, according to the information of a network monitoring screen representing a network configuration of said lower-side logical network.

5. The network management apparatus according to claim 4, wherein:

when said monitoring screen generation means receives an instruction from an operator to display an upper layer, said monitoring screen generation means specifies a logical network, referred to as an upper-side logical network, including a logical network whose network configuration is currently displayed and one layer higher than said logical network, and displays a network configuration of said upper-side logical network on the display unit, according to information on a network monitoring screen representing said network configuration of said upper-side logical network.

6. A program stored on a computer readable storage medium for implementing a network management apparatus, wherein said program is read and executed by a computer, comprising:

a collection means for collecting addresses assigned respectively to network elements belonging to an object network managed from said network elements, an acquisition means for acquiring address definition information that defines a logical hierarchical structure of the managed network, a configuration analysis means for classifying the addresses of the network elements collected by said collection means into logical networks in each of the logical layers of the managed networks specified by the address definition information acquired by said acquisition means, and for defining hierarchical relationships between the logical networks, and a monitoring screen generation means for generating information of a network monitoring screen for each logical network representing a network configuration in a layer unit just under the logical network in question, according to the hierarchical relationships of said logical network defined by said configuration analysis means, wherein:

said collection means collects element information including an address, connection relationships and element type of the network element in question, from each network element belonging to the managed network, said configuration analysis means defines relay nodes included in each logical network classified by said address definition information according to the element information collected by said collection means from each network element, and defines connection relationships between said relay nodes, and said monitoring screen generation means generates information of a network monitoring screen for each logical network by using symbols representing logical networks, referred to as lower-side logical networks, included in the logical network in question and belonging to a layer just under the logical network in question, symbols representing relay nodes included in the logical network in question, and symbols representing connections between the lower-side logical networks and the relay nodes, in order to display said network monitoring screen that represents the network configuration.

7. A network management method for managing a network configuration, comprising steps of:
- collecting addresses assigned respectively to network elements belonging to a managed network, from said network elements;
- acquiring address definition information defining a logical hierarchical structure of the managed network;
- classifying the collected addresses of the network elements into logical networks in each of the logical layers of the managed networks specified by said address definition information acquired, and defining hierarchical relationships between the logical networks; and
- generating information on a network monitoring screen for each logical network representing a network configuration in a layer just under the logical network in question, according to the above-defined hierarchical relationships of said logical network, wherein:
- said collecting step comprises collecting element information including an address, connection relationships and element type of the network element in question, from each network element belonging to the managed network,
- said classifying step comprises defining relay nodes included in each logical network classified by said address definition information according to the element information collected by said collecting step from each network element, and defining connection relationships between said relay nodes, and
- said generating step comprises generating information of a network monitoring screen for each logical network by using symbols representing logical networks, referred to as lower-side logical networks, included in the logical network in question and belonging to a layer just under the logical network in question, symbols representing relay nodes included in the logical network in question, and symbols representing connections between the lower-side logical networks and the relay nodes, in order to display said network monitoring screen that represents the network configuration.

* * * * *